(12) United States Patent
Son et al.

(10) Patent No.: US 11,199,709 B2
(45) Date of Patent: Dec. 14, 2021

(54) ELECTRONIC DEVICE, EXTERNAL ELECTRONIC DEVICE AND METHOD FOR CONNECTING ELECTRONIC DEVICE AND EXTERNAL ELECTRONIC DEVICE

(71) Applicant: Samsung Electronics Co., Ltd., Suwon-si (KR)

(72) Inventors: Dong-Il Son, Hwaseong-si (KR); Jong-Chul Choi, Suwon-si (KR); Seung-Nyun Kim, Incheon (KR); Yong-Sang Yun, Osan-si (KR); Won-Kyu Kwon, Seoul (KR); Chang-Ryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 16/463,165

(22) PCT Filed: Nov. 27, 2017

(86) PCT No.: PCT/KR2017/013621
§ 371 (c)(1),
(2) Date: May 22, 2019

(87) PCT Pub. No.: WO2018/097683
PCT Pub. Date: May 31, 2018

(65) Prior Publication Data
US 2019/0278089 A1 Sep. 12, 2019

(30) Foreign Application Priority Data

Nov. 25, 2016 (KR) .................. 10-2016-0158464

(51) Int. Cl.
*G06F 21/32* (2013.01)
*G02B 27/01* (2006.01)
(Continued)

(52) U.S. Cl.
CPC ......... *G02B 27/0172* (2013.01); *G02B 27/01* (2013.01); *G02B 30/00* (2020.01);
(Continued)

(58) Field of Classification Search
CPC .... G02B 27/0172; G02B 30/00; G02B 27/01; G02B 27/017; G02B 2027/0118;
(Continued)

(56) References Cited

U.S. PATENT DOCUMENTS

2013/0147686 A1* 6/2013 Clavin .................... G06F 3/013
345/8
2015/0111558 A1 4/2015 Yang
(Continued)

FOREIGN PATENT DOCUMENTS

KR 10-2015-0062303 A 6/2015
KR 10-1567469 B1 11/2015
(Continued)

*Primary Examiner* — Izunna Okeke
(74) *Attorney, Agent, or Firm* — Jefferson IP Law, LLP

(57) ABSTRACT

The present invention provides an electronic device, an external input device and a method for connecting the electronic device and the external input device. An electronic device according to various embodiments comprises: a camera module; a communication module, a display, a memory; and a processor electrically connected to the camera module, a communication module, a display and memory, wherein the processor displays, on the display, images comprising a left-eye image and a right-eye image, determines whether or not a connectable external input device is present if an event for the connection with the external input device occurs with respect to the images, displays, on at least one part of the display, external images, obtained by means of the camera module, if a connectable first external input device is present, and can perform
(Continued)

connection with the first external input device. Moreover, other embodiments are possible.

11 Claims, 27 Drawing Sheets

(51) Int. Cl.
    *G06T 7/73*           (2017.01)
    *G06F 3/01*           (2006.01)
    *G02B 30/00*          (2020.01)

(52) U.S. Cl.
    CPC .............. *G06F 3/013* (2013.01); *G06F 21/32* (2013.01); *G06T 7/74* (2017.01); *G02B 2027/0138* (2013.01)

(58) Field of Classification Search
    CPC .... G02B 2027/0178; G02B 2027/0187; G02B 2027/0196; G02B 2027/0163; G02B 2027/0161; G02B 27/0179; G02B 27/0101; G02B 27/0132; G02B 27/0093; G02B 2027/0138; G06T 7/74; G06T 7/70; G06F 3/013; G06F 21/32; G06F 21/00; G06F 21/30; G06F 21/31; G06F 3/011; G06F 3/012; G06F 3/014; G06B 30/00

See application file for complete search history.

(56) References Cited

U.S. PATENT DOCUMENTS

| | | | |
|---|---|---|---|
| 2015/0186636 A1* | 7/2015 | Tharappel | H04L 9/3231 726/8 |
| 2016/0025978 A1 | 1/2016 | Mallinson | |
| 2016/0062454 A1 | 3/2016 | Wang et al. | |
| 2016/0063766 A1 | 3/2016 | Han et al. | |
| 2016/0224176 A1 | 8/2016 | Kim et al. | |
| 2017/0061694 A1* | 3/2017 | Giraldi | G06F 3/013 |
| 2017/0244811 A1* | 8/2017 | McKenzie | G02B 27/017 |
| 2018/0096530 A1* | 4/2018 | Greenhalgh | H04N 5/2257 |

FOREIGN PATENT DOCUMENTS

| | | |
|---|---|---|
| KR | 10-2016-0026323 A | 3/2016 |
| KR | 10-2016-0026429 A | 3/2016 |
| KR | 10-2016-0094114 A | 8/2016 |

* cited by examiner

| TYPE OF DEVICE | OBJECT SENSING STATE | RAW DATA |
|---|---|---|
| BLUETOOTH KEYBOARD | OBJECT NOT SENSED | 0x00110110 |
| BLUETOOTH MOUSE | OBJECT NOT SENSED | 0x00110110 |
| RIGHT BLUETOOTH MOTION CONTROLLER | OBJECT NOT SENSED | 0x00110110 |
| LEFT BLUETOOTH MOTION CONTROLLER | OBJECT NOT SENSED | 0x00110110 |

FIG.16A

| TYPE OF DEVICE | OBJECT SENSING STATE | RAW DATA |
|---|---|---|
| BLUETOOTH KEYBOARD | OBJECT NOT SENSED | 0x00110110 |
| BLUETOOTH MOUSE | OBJECT NOT SENSED | 0x00110110 |
| RIGHT BLUETOOTH MOTION CONTROLLER | OBJECT SENSED | 0x11110111 |
| LEFT BLUETOOTH MOTION CONTROLLER | OBJECT NOT SENSED | 0x00110110 |

FIG.16B

ELECTRONIC DEVICE, EXTERNAL ELECTRONIC DEVICE AND METHOD FOR CONNECTING ELECTRONIC DEVICE AND EXTERNAL ELECTRONIC DEVICE

CROSS-REFERENCE TO RELATED APPLICATION(S)

This application is a National Phase Entry of PCT International Application No. PCT/KR2017/013621, which was filed on Nov. 27, 2017, and claims priority to Korean Patent Application No. 10-2016-0158464, which was filed on Nov. 25, 2016, the content of each of which are incorporated herein by reference.

TECHNICAL FIELD

Various embodiments of the present invention relate to an electronic device, an external electronic device, and a method for connecting the electronic device and the external electronic device.

BACKGROUND ART

Recently being developed are various electronic devices directly wearable on the human body. Examples of wearable devices include head-mounted displays, smart glasses, smart watches or wristbands, contact lens-type devices, ring-type devices, shoe-type devices, clothing-type devices, and glove-type devices and may come in various forms attachable to a body part or clothes.

DETAILED DESCRIPTION OF THE INVENTION

Technical Problem

Various embodiments provide an electronic device, and an external electronic device, and a method for connecting the two electronic devices, which facilitate use of an external input device while the user wears a head-mounted device.

Technical Solution

Various embodiments may provide an electronic device, an external electronic device, and a method for connecting the electronic device and the external electronic device.

According to various embodiments, an electronic device may include a camera module, a communication module, a display, a memory, and a processor electrically connected with the camera module, the communication module, the display, and the memory, wherein the processor may display an image including a left-eye image and a right-eye image on the display, determine whether there is a connectable external input device if an event for connection with an external input device occurs in relation to the image, display an external image obtained by the camera module on at least part of the display if there is a connectable first external input device, and perform connection with the first external input device.

According to various embodiments, there is provided a non-transitory recording medium storing instruction to execute a method of controlling an electronic device, the instructions configured to, when executed by at least one processor, enable the at least one processor to perform at least one operation, the at least one operation comprising displaying an image including a left-eye image and a right-eye image on a display, determining whether there is a connectable external input device if an event for connection with an external input device occurs in relation with the image, displaying an external image obtained using a camera module on at least part of the display if there is a connectable first external input device, and performing connection with the first external input device.

Advantageous Effects

According to various embodiments, the present invention allows the user to easily find an external electronic device even while wearing an electronic device and conveniently connect the external electronic device with the electronic device.

BRIEF DESCRIPTION OF DRAWINGS

FIGS. 16A and 16B are views illustrating examples of creating a table of at least one piece of external input data stored in a memory of an electronic device according to various embodiments;

MODE FOR CARRYING OUT THE INVENTION

Figure 1:
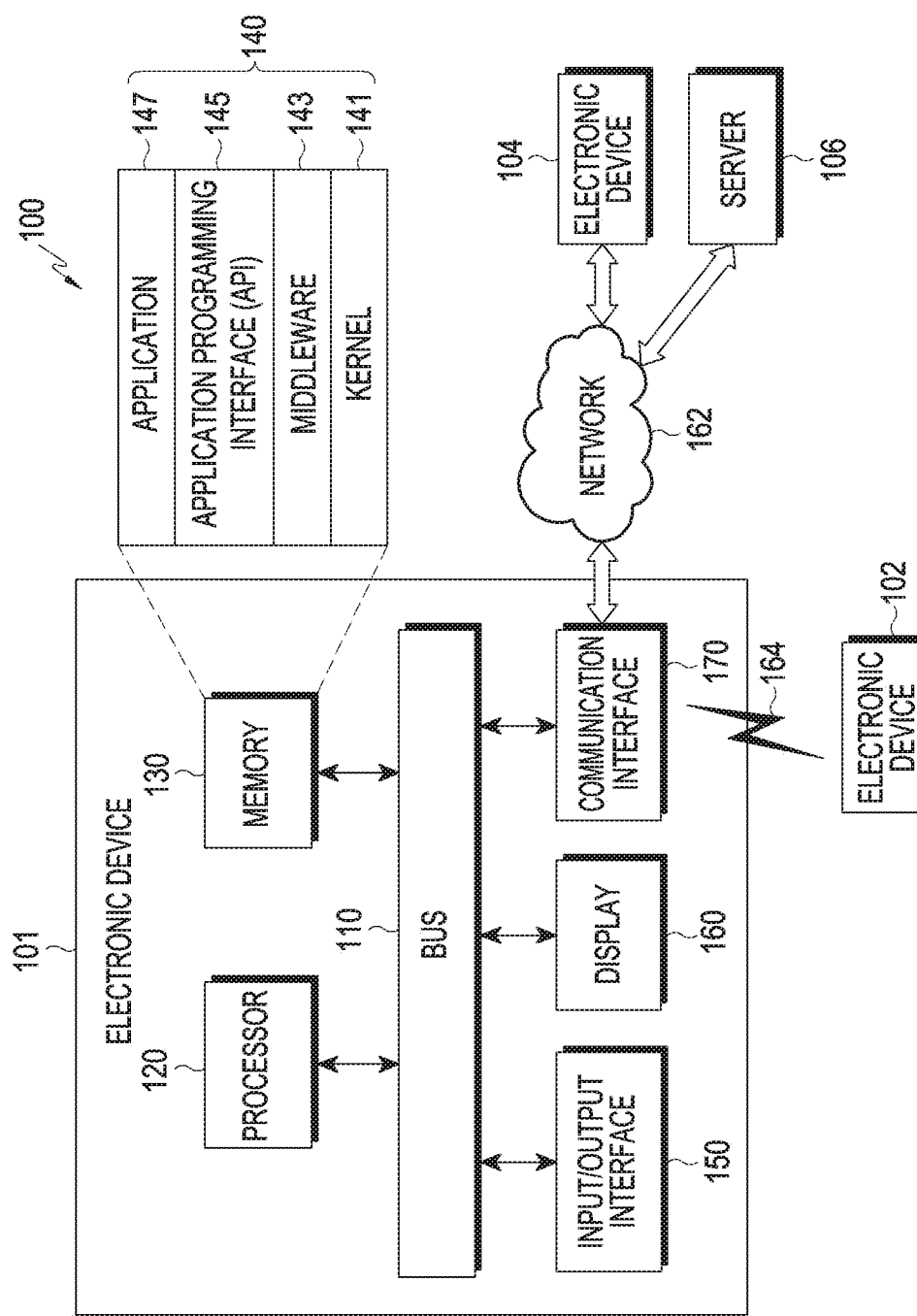
FIG. 1 illustrates a network environment including an electronic device according to various embodiments.

Hereinafter, embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B," "at least one of A and/or B," or "A/B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to another embodiment, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to some embodiments, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present invention, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component.

The bus 110 may include a circuit for connecting the components 110 to 170 with one another and transferring communications (e.g., control messages or data) between the components.

The processor 120 may include one or more of a central processing unit (CPU), an application processor (AP), or a communication processor (CP). The processor 120 may perform control on at least one of the other components of the electronic device 101, and/or perform an operation or data processing relating to communication.

According to an embodiment, the processor 120 may operate in a virtual reality mode to display an image including a left-eye image and a right-eye image on the display 160 and, when an event for connection with an external electronic device occurs in relation with the image, determine whether a connectable external input device exists. If there is a connectable first external input device, the processor 120 may display an external image obtained using a camera (not shown) on at least part of the display 160 and perform connection with the first external input device.

The memory 130 may include a volatile and/or non-volatile memory. For example, the memory 130 may store commands or data related to at least one other component of the electronic device 101.

According to an embodiment, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS).

For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity, drag, swipe, or hovering input using an electronic pen or a body portion of the user.

For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UNITS), wireless broadband (Wi-Bro), or global system for mobile communication (GSM). According to an embodiment of the present invention, the wireless communication may include at least one of, e.g., wireless fidelity (Wi-Fi), Bluetooth, Bluetooth low power (BLE), ZigBee, near field communication (NFC), magnetic secure transmission (MST), radio frequency, or body area network (BAN). According to an embodiment of the present invention, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard-232 (RS-232), power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101.

According to various embodiments, all or some of operations executed on the electronic device 101 may be executed on another or multiple other electronic devices (e.g., the electronic devices 102 and 104 or server 106).

According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
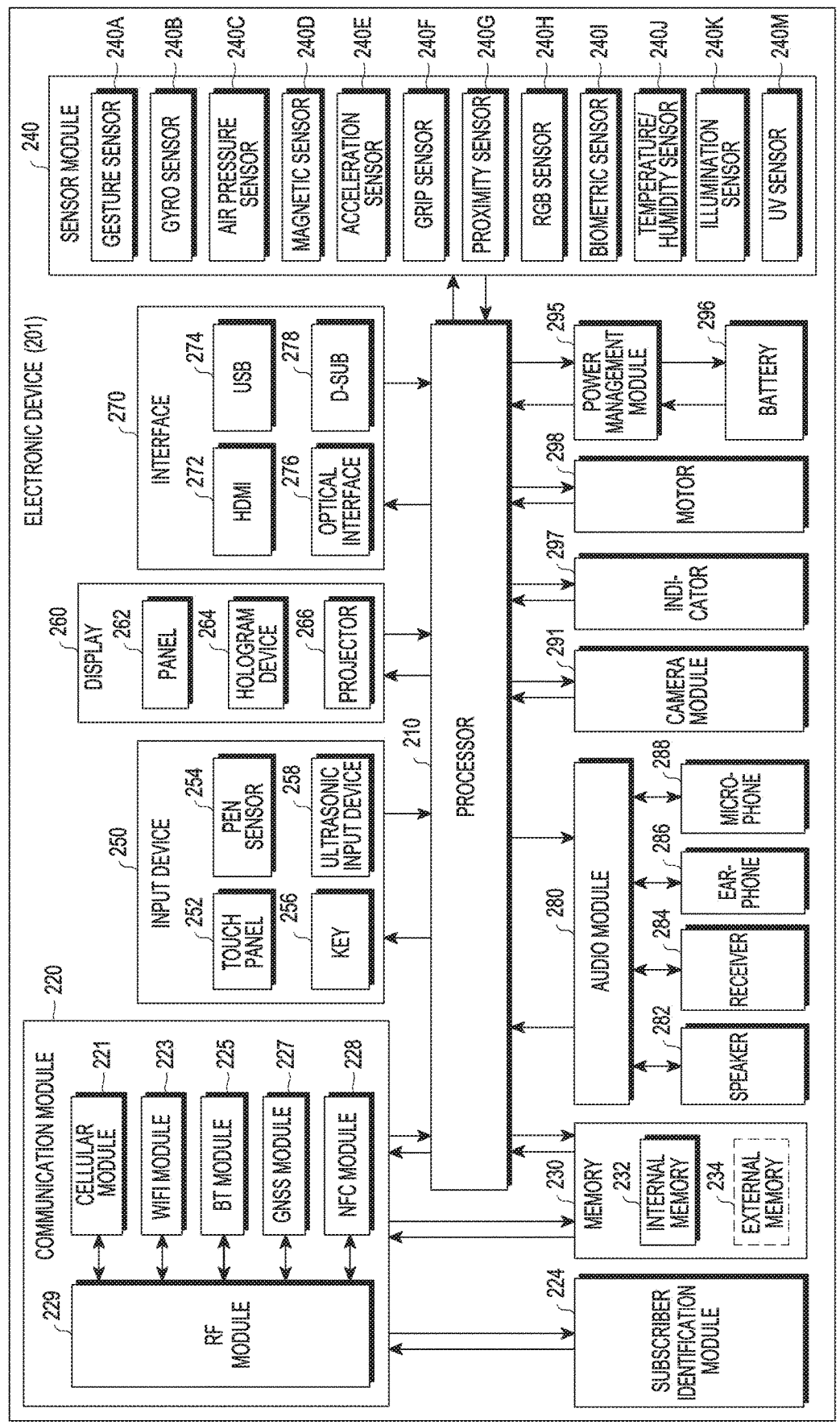
FIG. 2 is a block diagram illustrating an electronic device according to various embodiments.

FIG. 2 is a block diagram illustrating an electronic device 201 according to various embodiments. The electronic device 201 may include the whole or part of the configuration of, e.g., the electronic device 101 shown in FIG. 2. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC).

According to an embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

According to an embodiment, the processor 210 may operate in a virtual reality mode to display an image including a left-eye image and a right-eye image on the display 260 and, when an event for connection with an external electronic device occurs in relation with the image, determine whether a connectable external input device exists. If there is a connectable first external input device, the processor 210 may switch to a see-through mode to display an external image obtained using the camera module 291 on at least part of the display 260 and perform connection with the first external input device.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment of the present invention, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amplifier module (PAM), a frequency filter, a low noise amplifier (LNA), or at least one antenna. According to another embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present invention, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment, one or more image sensors (e.g., front and back sensors), a lens, an image signal processor (ISP), or a flash such as an LED or xenon lamp.

The power manager module 295 may manage power of the electronic device 201, for example. According to an embodiment of the present invention, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
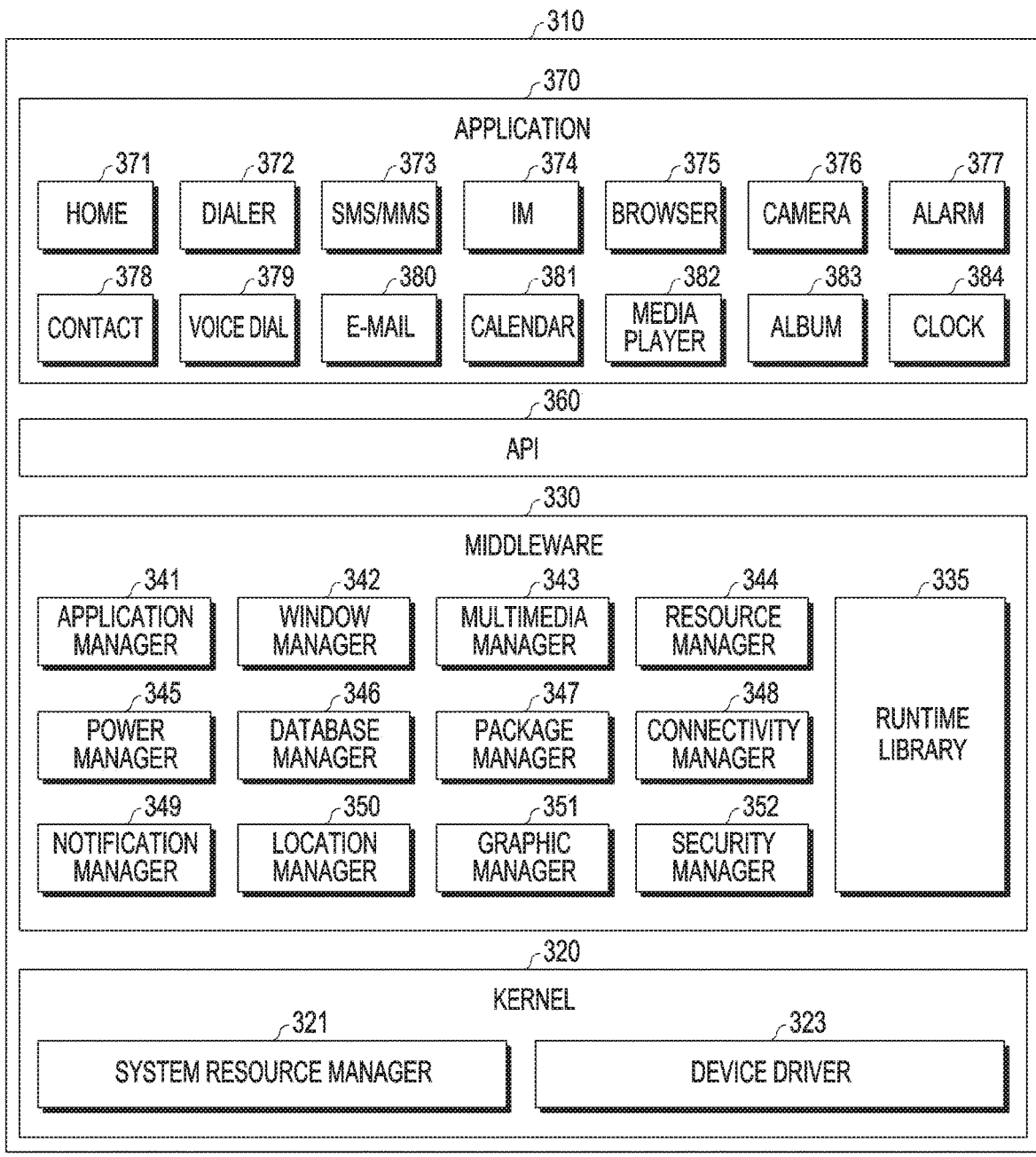
FIG. 3 is a block diagram illustrating a program module according to various embodiments.

FIG. 3 is a block diagram illustrating a program module according to various embodiments. According to an embodiment, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™ Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present invention, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present invention, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present invention, the middleware 330 may include a telephony manager for managing the voice or video call function of the electronic device or a middleware module able to form a combination of the functions of the above-described elements. According to an embodiment of the present invention, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information). According to an embodiment of the present invention, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present invention, the application 370 may include an application (e.g., a healthcare application of a mobile medical device) designated according to an attribute of the external electronic device. According to an embodiment of the present invention, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
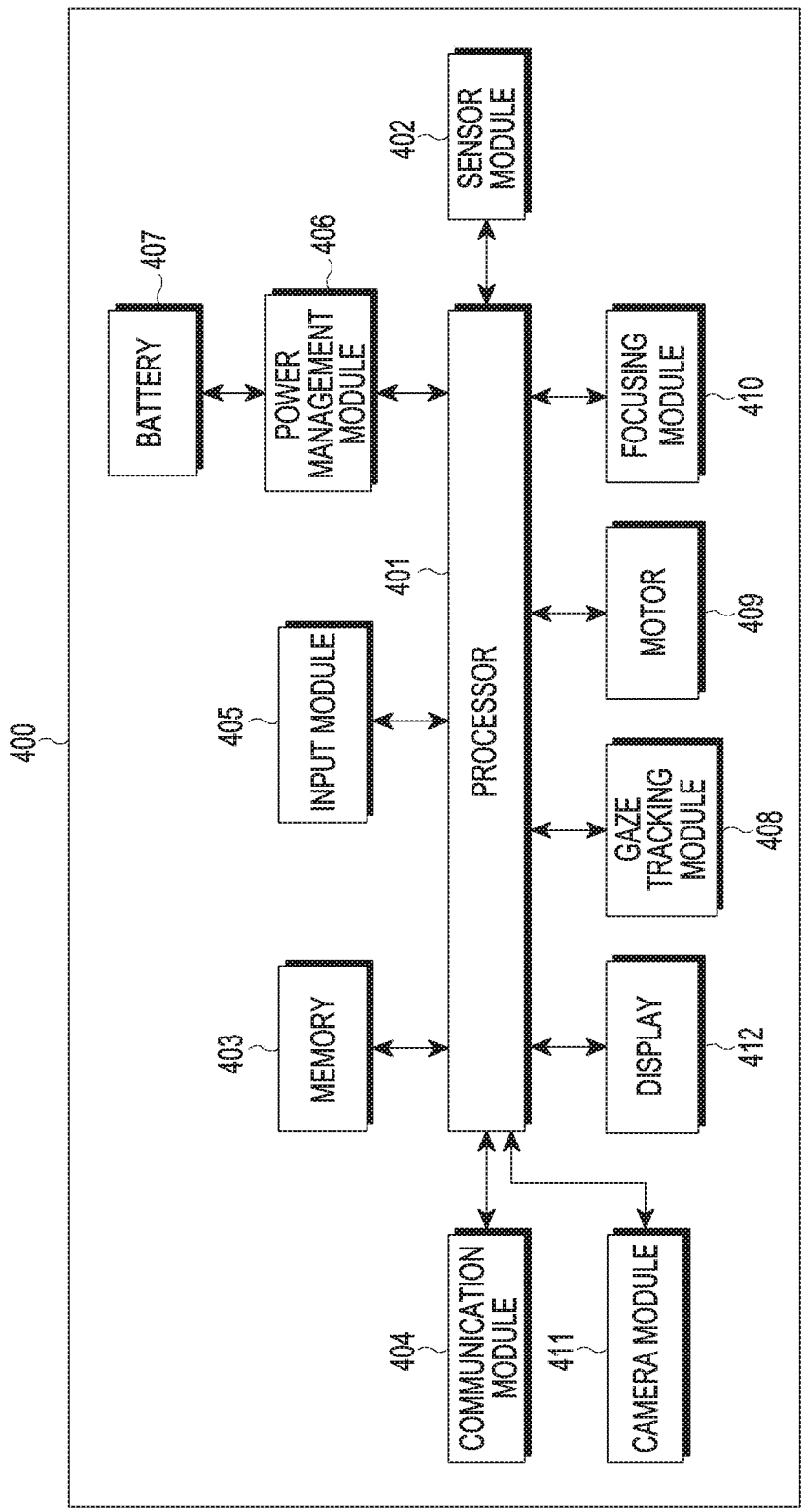
FIG. 4 is a view illustrating a configuration of an electronic device according to various embodiments.

FIG. 4 is a view illustrating a configuration of an electronic device according to an embodiment of the present invention.

Figure 5A:
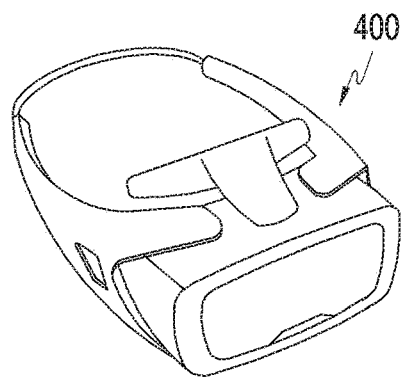
FIGS. 5A, 5B, and 5C are views illustrating example electronic devices according to various embodiments.
Figure 5B:
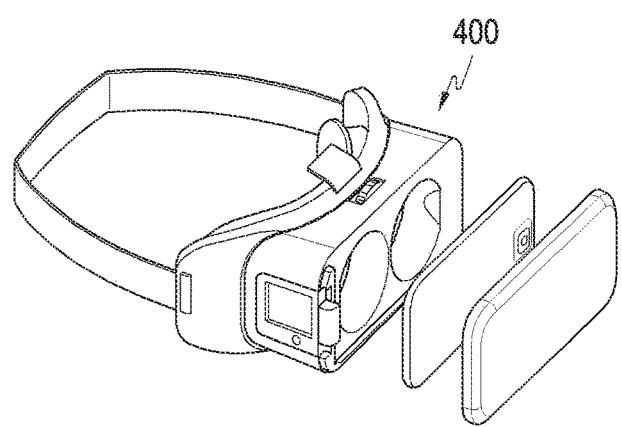
Figure 5C:
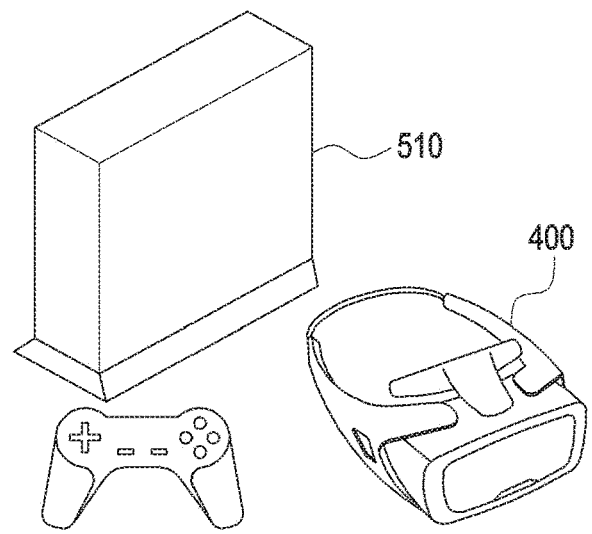

Referring to FIG. 4, an electronic device 400 may include a processor 401, a sensor module 402, a memory 403, a communication module 404, an input module 405, a power management module 406, a battery 407, a gaze tracking module 408, a motor 409, a focusing module 410, a camera module 411, and a display 412. According to various embodiments, the electronic device 400 may be a wearable device (or a head-mounted device (HMID)). For example, the electronic device 400 may be implemented in such a form as to perform image processing on virtual reality inside the electronic device 400 as shown in FIG. 5A or to perform image processing on virtual reality inside a mobile device 500 mounted on the electronic device 400 as shown in FIG. 5B. Or, the electronic device 400 may be implemented in such a form as to sense the user's wearing, transfer the sensed signal to a separate processing device 510 (e.g., a console device or PC), and receive a virtual reality image from the separate processing device 510 as shown in FIG. 5c.

According to an embodiment, the processor 401 may operate in a virtual reality mode to display an image including a left-eye image and a right-eye image on the display 412 and, when an event for connection with an external electronic device occurs in relation with the stereoscopic image, determine whether a connectable external input device exists. If there is a connectable first external input device, the processor 401 may switch to a see-through mode to display an external image obtained using the camera module 411 on at least part of the display 412 and perform connection with the first external input device. For example, the image including the left-eye image and the right-eye image may be a stereoscopic image.

According to various embodiments, upon sensing the user's wearing (or mounting) of the electronic device 400 via the sensor module 402, the processor 401 may determine whether it is connected to an external electronic device and, upon determining that it is not connected to an external electronic device, determine whether there is an inputtable external input device. Upon determining that it is connected with an external electronic device, the processor 401 may control the external input device connected. If there is an inputtable external input device, the processor 401 may enter into a see-through mode.

Upon receiving a signal according to sensing of the user's input (e.g., a touch or grip) or biometric authentication information from the external input device, the processor 401 may perform connection with the external input device and, after connection is complete, switch to a virtual reality mode. For example, the virtual reality mode may be an operation mode to display virtual reality content and may be an operation mode to display, on a single screen, a first image corresponding to the user's left eye and a second image corresponding to the user's right eye.

For example, upon receiving a signal according to sensing of the user's input or biometric authentication information from an external input device, the processor 401 may perform connection with the external input device and, after connection is complete, switch to the virtual reality mode. Upon receiving a signal according to non-sensing of the user's input or non-sensing of biometric authentication information from the external input device, the processor 401 may wait to receive a signal from other external input device or terminate the operation.

According to an embodiment, the processor 401 may determine whether there is a connectable external input device if an event to connect the external input device occurs in the virtual reality mode. For example, the event may include a case where the user's wearing of the electronic device 400 is sensed via the sensor module 402, a case where a screen requiring the user's input is displayed while a head-mounted device (HMD) is worn, or a case where content for inputting user information using an external input device is displayed. If there is an inputtable external input device, the processor 401 may switch to a see-through mode. Upon sensing the user's input or biometric authentication information via the external input device, the processor 401 may perform connection with the external electronic device and, after the connection is complete, switch to the virtual reality mode. For example, upon receiving a signal according to sensing of the user's input or biometric authentication information from an external input device, the processor 401 may perform connection with the external input device.

According to various embodiments, upon sensing the user's wearing (or mounting) of the electronic device 400, the processor 401 may wait to pair with at least one external input device. Upon receiving an advertising signal from at least one external input device, the processor 401 may enter into a see-through mode. The processor 401 may periodically broadcast request signals for scanning and receive a response signal from at least one external input device. In a case where a response signal received from a first external input device among at least one external input device contains sensing information indicating that the user's input or biometric authentication information is sensed through the first external input device, the processor 401 may perform connection with the first external input device and, after the connection is complete, switch to the virtual reality mode.

According to various embodiments, upon sensing the user's wearing of the electronic device 400, the processor

401 may periodically broadcast request signals for scanning and receive a response signal from at least one external input device. Upon receiving a response signal from at least one external input device, the processor 401 may enter into a see-through mode. Upon receiving a response signal containing sensing information from a first external input device among at least one external input device in response to the request signal, the processor 401 may determine whether an input to accept connection with the first external input device is received. For example, the processor 401 may determine whether an input (e.g., a button input or touch input) to accept the connection or a gesture (e.g., nodding) to accept the connection via the input device 405 provided in the electronic device 400 is sensed. Upon receiving an input to accept the connection with the first external input device, the processor 401 may perform connection with the first external input device and switch to the virtual reality mode.

According to various embodiments, in a case where the electronic device 400 includes a plurality of antennas, upon sensing the wearing of the electronic device 400, the processor 401 may form an initial beam region for scanning using the plurality of antennas according to the direction of the electronic device 400. Upon sensing a signal from at least one external input device in the formed initial beam region (e.g., a first beam region), the processor 401 may enter into the see-through mode. If sensing no signal from at least one external input device in the initial beam region, the processor 401 may detect a field-of-view (FOV) according to the direction of the user's gaze and may form a beam region (e.g., a second beam region) for scanning using the plurality of antennas in a particular region corresponding to the detected FOV. For example, the processor 401 may form the beam region by intensively outputting beam signals to the particular region. Upon sensing a signal from at least one external input device in the formed second beam region, the processor 401 may enter into the see-through mode. Upon receiving a signal containing sensing information from a first external input device among at least one external input device, the processor 401 may perform connection with a first external input device and, after the connection is complete, switch to the virtual reality mode.

According to various embodiments, the electronic device 400 may perform connection with at least one external device using signals with the property of straight line propagation (e.g., EX optical signals or infrared signals). For example, in a case where the electronic device 400 includes an infrared sensor and an LED, upon sensing the user's wearing of the electronic device 400, the processor 401 may output an infrared signal to a particular region corresponding to the direction of the user's gaze via the infrared LED. Upon receiving a signal for connection from at least one external input device in response to the infrared signal, the processor 401 may perform connection with at least one external input device. For example, the signal for connection, which is received from at least one external input device, may contain connection information about the at least one external input device. The connection information may be, e.g., infrared communication information, Bluetooth information, or Wi-Fi information for connection.

According to various embodiments, upon receiving a communication signal according to a non-sensing of the user's input or biometric authentication information from a first external input device connected while being connected with a plurality of external input devices, the processor 401 may determine whether it is an event to switch to an external input device. For example, upon receiving a communication signal according to a non-sensing of the user's input or biometric authentication information from the first external input device, the processor 401 may drive a timer (not shown) to determine whether a signal according to a sensing of the user's input or biometric authentication information is received within a preset time. Unless receiving a signal according to a sensing of the user's input or biometric authentication information, the processor 401 may determine that it is an event to switch to the external input device. If the signal according to a sensing of the user's input or biometric authentication information is determined to be an event to switch to the external input device, the processor 401 may deactivate the first external input device and switch to the see-through mode. Unless the signal according to a sensing of the user's input or biometric authentication information is determined to be an event to switch to the external input device, the processor 401 may maintain the connection with the first external input device. For example, when a signal according to a sensing of the user's input or biometric authentication information is received from the first external input device within a preset time, the processor 401 may maintain connection with the first external input device. After deactivating the first external input device and upon receiving a signal according to a sensing of the user's input or biometric authentication information from a second external input device, the processor 401 may activate the second external input device and switch to the virtual reality mode.

According to various embodiments, the processor 401 may gather the user's biometric authentication information and store the gathered biometric authentication information in the memory 403. For example, the processor 401 may obtain biometric authentication information for performing biometric authentication on the user, e.g., the user's iris information or fingerprint information, using a biometric sensor (not shown) included in the sensor module 402. If an event for connection with an external input device occurs, the processor 401 may identify whether there is a connectable external input device and, if there is a connectable external input device, switch to the see-through mode. For example, if the processor 401 receives an advertising signal from at least one external input device or the processor 401 broadcasts request signals for scanning and receives a response signal from at least one external input device, then the processor 401 may determine that there is a connectable external input device. The processor 401 may output a request signal for scanning to at least one external input device and receive a response signal containing biometric authentication information along with sensing information from a first external input device among the at least one external input device. The processor 401 may compare the received biometric authentication information with stored biometric authentication information and, if matching, perform connection between the electronic device 400 and the first external input device and, after the connection is complete, switch to the virtual reality mode. Unless the received biometric authentication information matches the stored biometric authentication information, the processor 401 may display on the display 412 or output in a voice via a microphone (not shown) information indicating that the first external input device is used by a user other than a user whose biometric authentication information has been registered.

According to various embodiments, the processor 401 may allow the biometric authentication information input via the external input device upon initial connection between the electronic device 400 and the external input device to match the biometric authentication information stored in the memory 403. For example, in a case where the user's iris information is stored in the memory 403 and the user's fingerprint information is input via the external input device, the processor 401 may perform additional user authentication to map the user's iris information and the fingerprint information. The user authentication may be performed by requesting a particular gesture, a particular input, a particular voice utterance, or a particular password.

According to an embodiment, the sensor module 402 may measure a physical quantity or detect an operational stage of the electronic device 400, and the sensor module 430 may convert the measured or detected information into an electrical signal and output the same. For example, the sensor module 402 may include at least one of an acceleration sensor, a gyro sensor, a geo-magnetic sensor, a magnetic sensor, a proximity sensor, a gesture sensor, a grip sensor, an infrared (IR) sensor, or a biometric sensor.

According to various embodiments, the sensor module 402 may sense the user's wearing (or mounting) of the electronic device 400 using a proximity sensor or grip sensor. For example, the sensor module 402 may sense at least one of IR recognition, pressure recognition, or capacitance (or permittivity) variation according to the user's wearing and determine whether the user's wearing is sensed. According to various embodiments, the biometric sensor may include an iris sensor and/or a fingerprint sensor.

According to various embodiments, the sensor module 402 may sense a head motion (e.g., a nodding gesture) of the user wearing the electronic device 400 using an acceleration sensor, gyro sensor, geo-magnetic sensor, or gesture sensor.

According to an embodiment, the memory 403 may store information used in the electronic device 400. For example, the memory 403 may store the user's biometric authentication information obtained via the sensor module 402. For example, the memory 403 may have a security region and store biometric information for user authentication in the security region.

According to an embodiment, the communication module 404 may perform communication with at least one external input device. For example, the communication module 404 may include a USB module, a Wi-Fi module, a Bluetooth module, an NFC module, a GPS module, or a cellular communication module. According to various embodiments, the communication module 404 may receive an advertising signal and/or response signal from at least one external input device or transfer a request signal to at least one external input device.

According to an embodiment, the input module 405 may include a touchpad and/or buttons and receive user inputs therethrough. For example, the input module 405 may receive a user input (e.g., a key input) to switch from a first external input device to a second external input device.

According to an embodiment, the power management module 406 may control the battery 407 to manage the power of the electronic device 400.

According to an embodiment, the battery 407 may include a rechargeable battery and/or a solar cell. According to various embodiments, the battery 407 may wiredly or wirelessly receive power from the outside.

According to an embodiment, the gaze tracking module 408 may track the user's gaze using at least one of, e.g., an electronical oculography (EOG) sensor, a coil system, a dual purkinje system, a bright pupil system, and a dark pupil system. According to various embodiments, the gaze tracking module 408 may further include a micro camera for gaze tracking.

According to an embodiment, the motor 409 may convert an electric signal to a mechanical vibration and may generate a vibrational or haptic effect.

According to an embodiment, the focusing module 410 may measure the user's inter-pupil distance (IPD) and adjust the position of the display 412 and the lens distance to allow the user to view images fitting his vision.

According to an embodiment, the camera module 411 may capture an image and transfer the captured image to the display 412. For example, at least part of the image captured by the camera module 411 may be displayed on the display 412.

According to an embodiment, the display 412 may display virtual reality content in the virtual reality mode and display images captured by the camera module 411 in the see-through mode. For example, the virtual reality content may be content including two images (e.g., left-eye image and right-eye image) which are identical or partially identical.

According to an embodiment, an electronic device 400 may include a camera module 411, a communication module 404, a display 412, a memory 403, and a processor 401 electrically connected with the camera module 411, the communication module 404, the display 412, and the memory 403. The processor 401 may display an image including a left-eye image and a right-eye image on the display 412, determine whether there is a connectable external input device if an event for connection with an external input device occurs in relation to the image, display an external image obtained by the camera module on at least part of the display 412 if there is a connectable first external input device, and perform connection with the first external input device.

Figure 6:
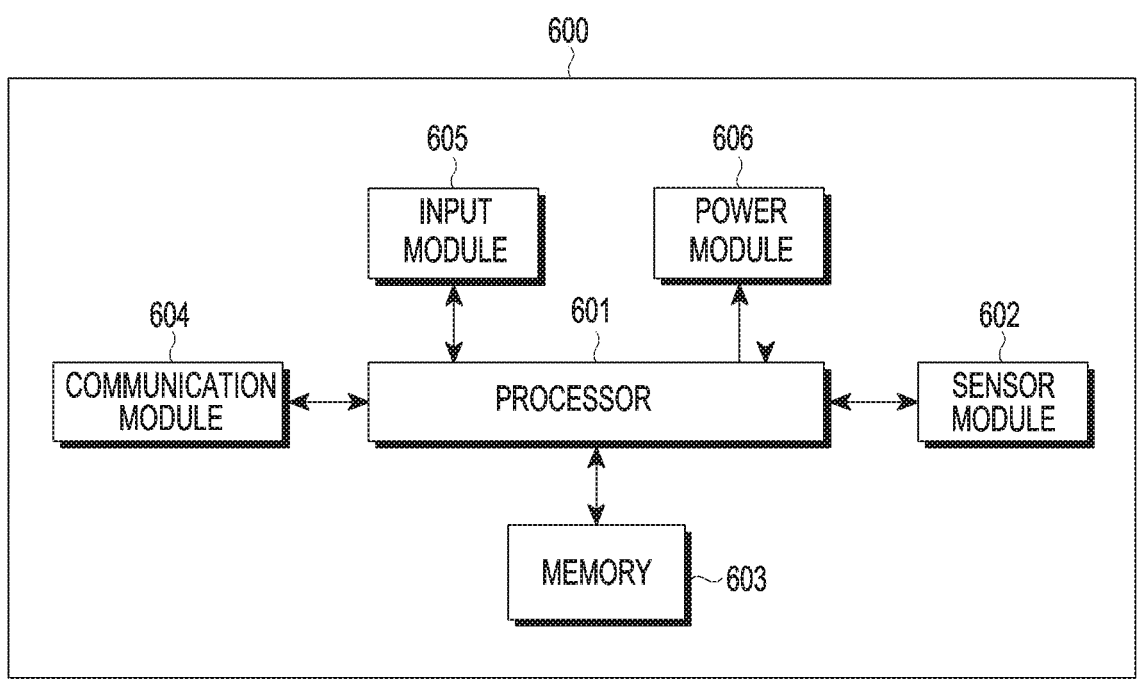
FIG. 6 is a view illustrating a configuration of an external input device according to various embodiments.

FIG. 6 is a view illustrating a configuration of an external input device according to various embodiments.

Figure 7:
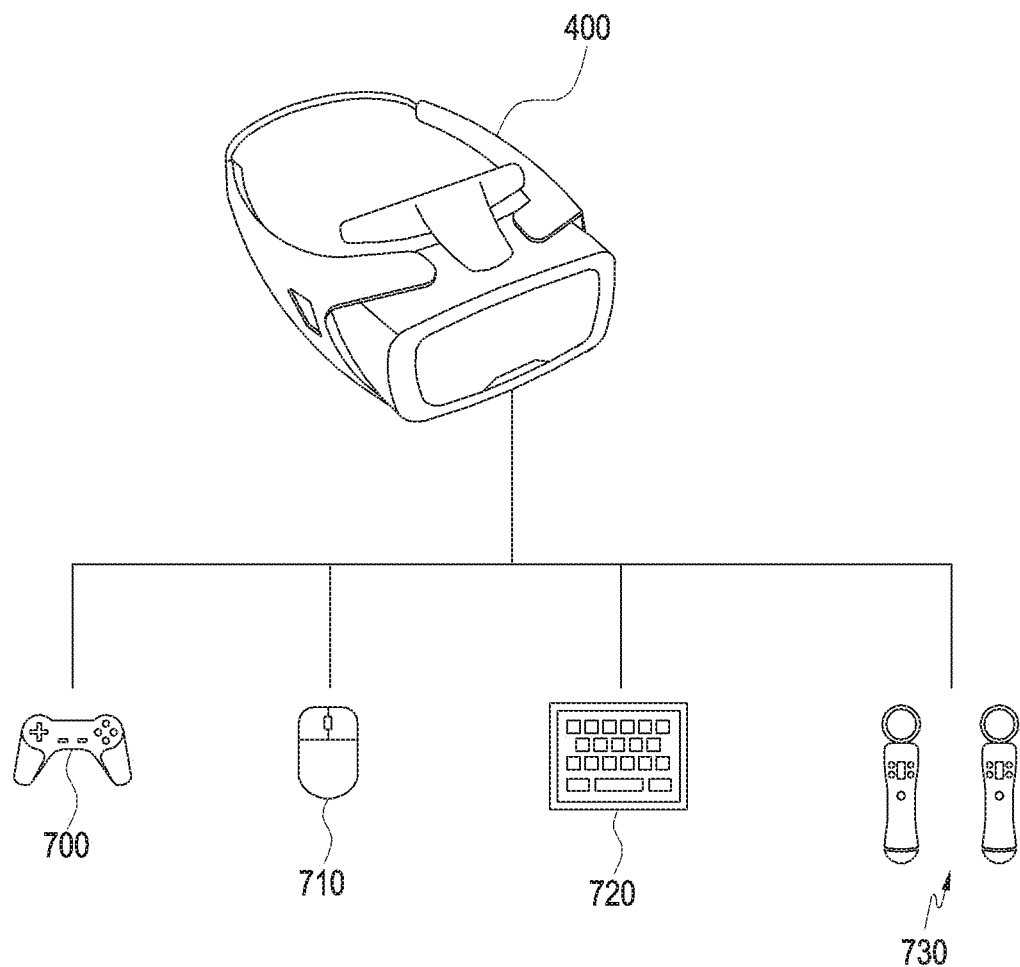
FIG. 7 is a view illustrating an example external input device according to various embodiments.

Referring to FIG. 6, an external input device 600 may include a processor 601, a sensor module 602, a memory 603, a communication module 604, an input module 605, and a power module 606. For example, the external input device 600 may include at least one of, e.g., a first game controller 700, a mouse 710, a keyboard 720, and a plurality of second game controllers 730 as shown in FIG. 7.

According to an embodiment, upon receiving a request signal for scan response (e.g., a scan response request signal) from the electronic device 400, the processor 601 may transfer a response signal to the electronic device 400. The request signal may be sequentially sensed by the communication module 604 and be transferred to the processor 601. The response signal may contain information indicating whether the user's input or biometric authentication information to the external input device 600 is sensed. For example, the processor 601 may determine whether the user's input or biometric authentication information is sensed through the sensor module 602 and, upon receiving a scan response request signal from the electronic device 400, transfer a response signal containing a result of the determination to the electronic device 400. Upon sensing the user's input or biometric authentication information, the processor 601 may transfer a signal according to a sensing of the user's input or biometric authentication information to the electronic device 400. Unless sensing the user's input or biometric authentication information, the processor 601 may transfer a signal according to a non-sensing of the user's input or biometric authentication information to the electronic device 400.

Upon receiving a connection request signal from the electronic device 400, the processor 601 may transfer a connection response signal in response to the connection request signal and perform connection with the electronic device 400.

According to various embodiments, the processor 601 may broadcast advertising signals. For example, the advertising signal may contain information indicating whether the user's input or biometric authentication information is sensed.

According to various embodiments, upon sensing the user (e.g., approach or grip) through the sensor module 602, the processor 601 may measure the user's biometric authentication information, include the measured biometric authentication information in a response signal, and transfer the response signal to the electronic device 400.

According to various embodiments, in a case of receiving scan response request signals from a plurality of electronic devices, the processor 601 may respond to the earlier-received scan response request signal and discard the later-received scan response request signal. For example, if the processor 601 receives a first scan response request signal from a first electronic device and then a second scan response request signal from a second electronic device, the processor 601 may transfer a scan response signal (ACK) in response to the first scan response request signal received from the first electronic device and discard the second scan response request signal received from the second electronic device.

According to an embodiment, the sensor module 602 may sense the user's input or biometric authentication information. For example, the sensor module 602 may include at least one of a grip sensor, a proximity sensor, a touch sensor, a pressure sensor, and a biometric sensor.

According to an embodiment, the sensor module 602 may sense the user's grip via the grip sensor, the user's approach via the proximity sensor, the user's touch via the touch sensor, and the user's pressure via the pressure sensor. The sensor module 602 may sense at least one of the user's grip, approach, touch, and pressure using the plurality of sensors.

According to an embodiment, the biometric sensor may include an iris sensor and/or a fingerprint sensor and obtain the user's iris information and/or fingerprint information.

According to an embodiment, the memory 603 may store information used in the external input device 600. For example, the memory 603 may store biometric information obtained via a biometric sensor. According to an embodiment, the memory 603 may have a security region and store obtained biometric information in the security region.

According to an embodiment of the present invention, the communication module 604 may communicate with the electronic device 400. For example, the communication module 604 may include at least one of a Wi-Fi module, a Bluetooth module, an NFC module, a 60 GHz band communication module, and a wireless gigabit (WIGig) module.

According to various embodiments, the communication module 604 may receive a request signal from the electronic device 400 or transfer an advertising signal and/or response signal to the electronic device 400.

According to an embodiment, the input module 605 may include a touchpad to recognize touch input and/or buttons and receive user inputs therethrough. For example, the touchpad may recognize touch input in at least one of a capacitive, resistive, infrared, or ultrasonic scheme, and the buttons may include physical buttons, optical keys, or a keypad.

According to an embodiment, the power module 606 may power on or off the external electronic device 600.

According to an embodiment, an external electronic device 600 may include an input module 605, a communication module 604, a sensor module 602, a memory 603, and a processor 601 electrically connected with the input module 605, the communication module 604, the sensor module 602, and the memory 603. Upon receiving a first signal from an external electronic device, the processor 601 may transfer a second signal according to biometric authentication information or a user input sensed through the sensor module 602 to the external electronic device and perform connection with the external electronic device in response to a connection request from the external electronic device.

Figure 8:
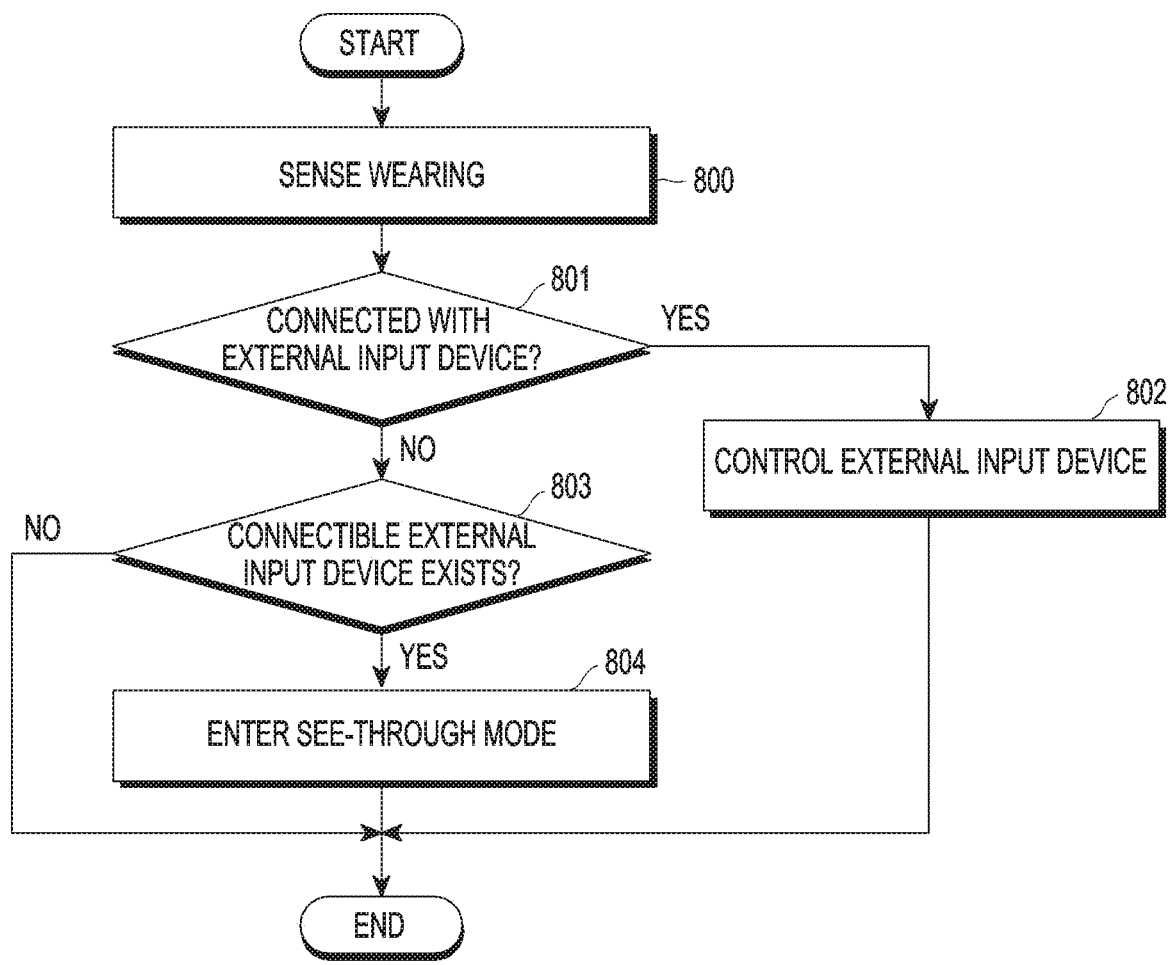
FIG. 8 is a flowchart for an electronic device to enter a see-through mode according to various embodiments.

FIG. 8 is a flowchart for an electronic device to enter a see-through mode according to various embodiments.

According to various embodiments, operations 800 to 805 may be performed by any one of electronic devices 101, 102, 104, 201, or 400, a server 106, processors 120, 210, 401, or 601, a program module 310, and an external input device 600.

Referring to FIG. 8, an electronic device 400 (e.g., the processor 401) may sense the user's wearing in operation 800. For example, the electronic device 400 (e.g., the processor 401) may sense whether the user wears the electronic device 400 through the sensor module 402.

In operation 801, the electronic device 400 (e.g., the processor 401) may determine whether it is connected with an external input device and, if it is determined to be connected with an external input device, perform operation 802 to control the external input device and, if it is not determined to be connected with an external input device, perform operation 803.

In operation 803, the electronic device 400 (e.g., the processor 401) may determine whether there is a connectable external input device and, if there is determined to be a connectable external input device, perform operation 804 and, if there is not determined to be a connectable external input device, terminate the operation. For example, upon receiving an advertising signal or a response signal responsive to a scan response request signal from at least one external input device, the electronic device 400 (e.g., the processor 401) may determine that there is a connectable external input device.

In operation 804, the electronic device 400 (e.g., the processor 401) may enter into the see-through mode.

Figure 9:
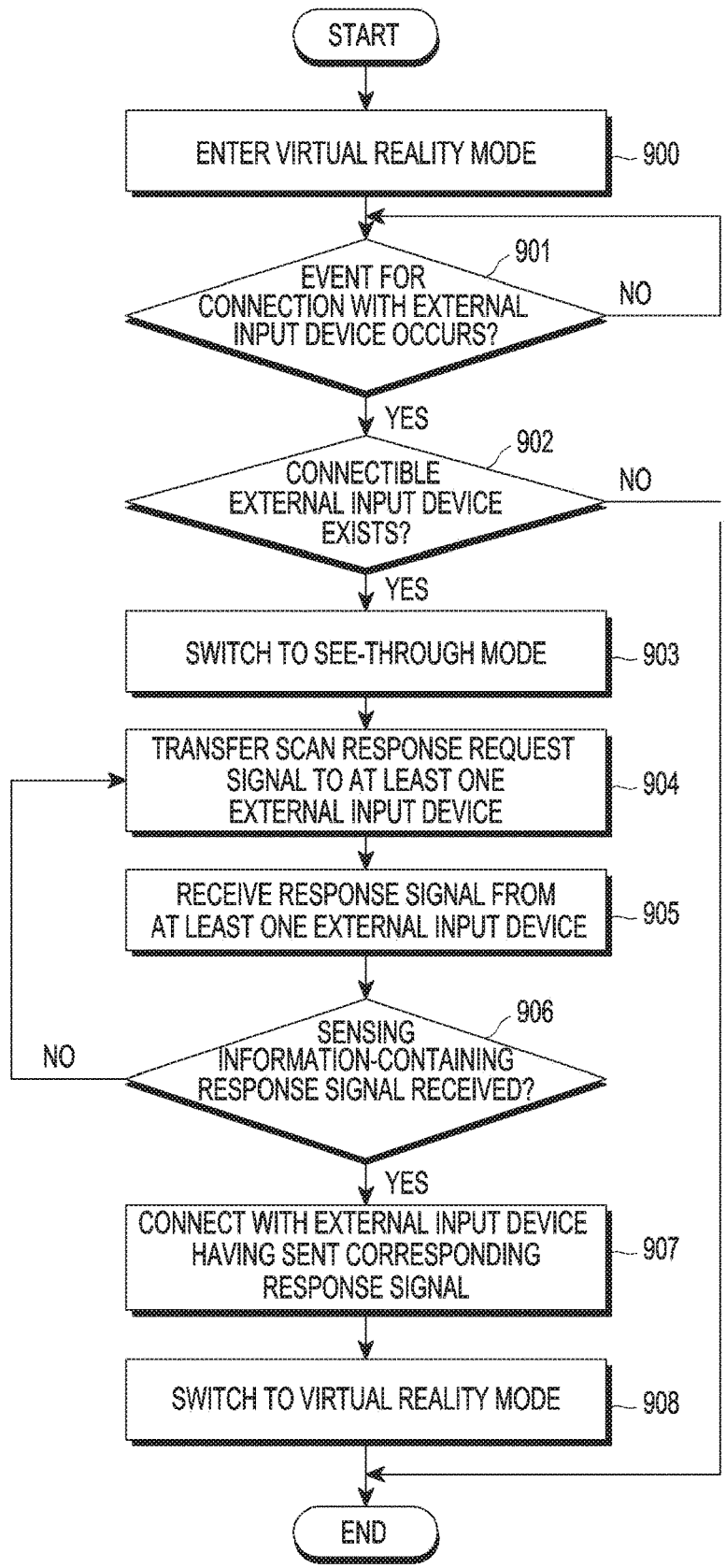
FIG. 9 is a flowchart for an electronic device to perform connection with an external electronic device according to various embodiments.

FIG. 9 is a flowchart for an electronic device to perform connection with an external electronic device according to various embodiments.

According to various embodiments, operations 900 to 908 may be performed by any one of electronic devices 101, 102, 104, 201, or 400, a server 106, processors 120, 210, 401, or 601, a program module 310, and an external input device 600.

Figure 10A:
FIGS. 10A and 10B are views illustrating examples for describing a virtual reality mode according to various embodiments.
Figure 10B:
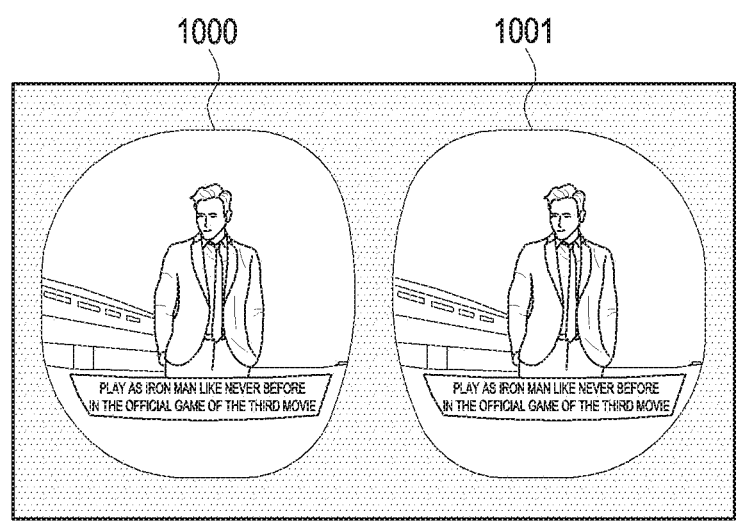

Referring to FIG. 9, the electronic device 400 (e.g., the processor 401) may enter into a virtual reality mode in operation 900. According to an embodiment, the virtual reality mode may be an operation mode to display images similar to an image displayed on one screen as shown in FIG. 10A on two screen regions 1000 and 1001 respectively corresponding to the left eye and right eye as shown in FIG. 10B. According to an embodiment, the virtual reality mode may be an operation mode to display content containing two images which are identical or partially identical.

In operation 901, the electronic device 400 (e.g., the processor 401) may determine whether an event for connection with an external input device occurs and, if the event is determined to occur, perform operation 902 and, unless the event is determined to occur, determine whether such an event occurs in operation 901.

In operation 902, the electronic device 400 (e.g., the processor 401) may determine whether there is a connectable external input device and, if there is determined to be a connectable external input device, perform operation 903 and, if there is not determined to be a connectable external input device, terminate the operation. According to an embodiment, upon receiving an advertising signal or a response signal responsive to a scan response request signal from at least one external input device, the electronic device 400 (e.g., the processor 401) may determine that there is a connectable external input device.

Figure 11:
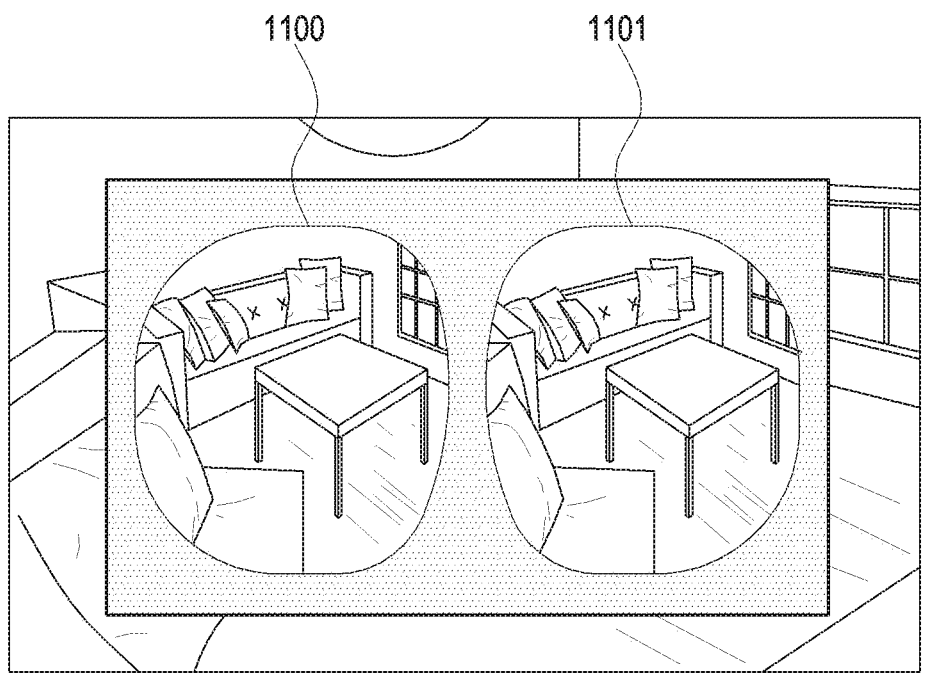
FIG. 11 is a view illustrating an example see-through mode according to various embodiments.

In operation 903, the electronic device 400 (e.g., the processor 401) may switch to a see-through mode. According to an embodiment, the electronic device 400 (e.g., the processor 401) may display an image (e.g., a preview image) output from the camera module 411 to each of two screen regions 1100 and 1101 corresponding to the user's left and right eye as shown in FIG. 11.

Figure 12:
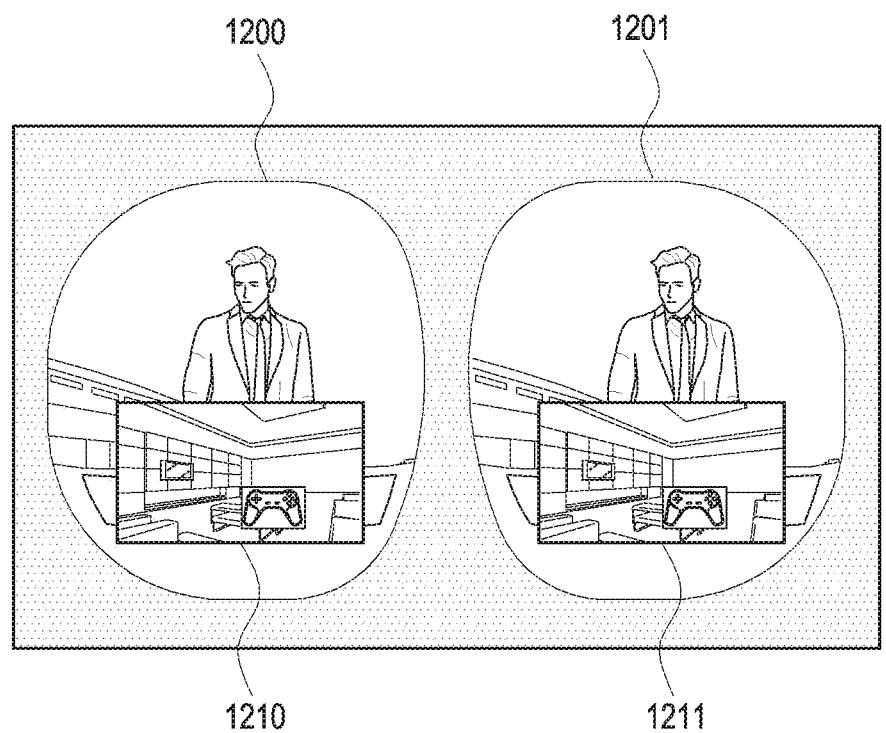
FIG. 12 is a view illustrating an example see-through mode according to various embodiments.

According to various embodiments, the electronic device 400 (e.g., the processor 401) may display, in a picture-in-picture mode, preview images (e.g., see-through content) 1210 and 1211 on the respective portions of two screen regions 1200 and 1201 corresponding to the user's left and right eye while displaying a first image (e.g., virtual reality content) on each of the two screen regions 1200 and 1201 as shown in FIG. 12. For example, the electronic device 400 (e.g., the processor 401) may continue or stop playing virtual reality content when performing the see-through mode.

Figure 13:
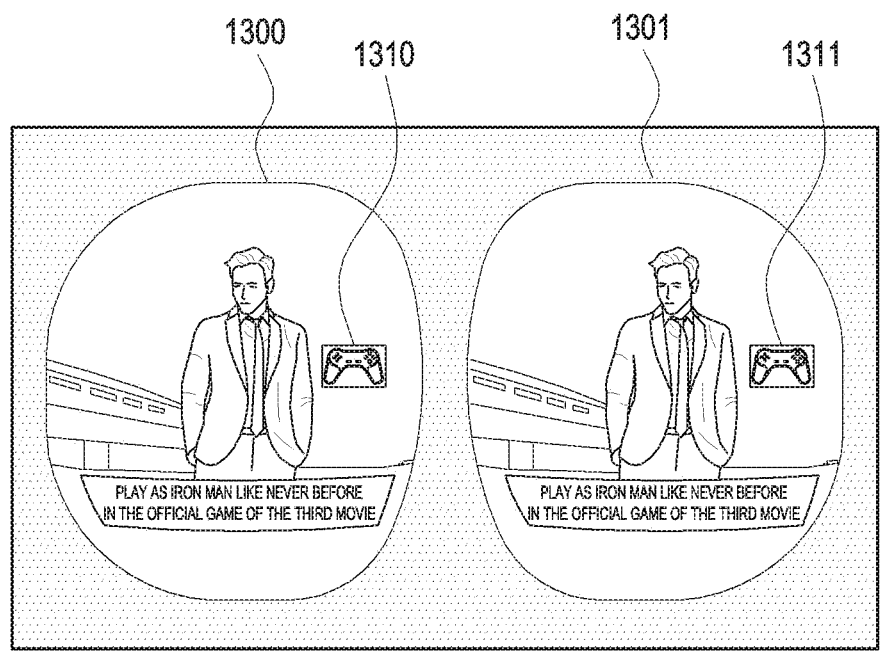
FIG. 13 is a view illustrating an example see-through mode according to various embodiments.

According to various embodiments, the electronic device 400 (e.g., the processor 401) may map and display second images 1310 and 1311 from an external input device, which are obtained through the camera module 411, in the respective particular positions of two screen regions 1300 and 1301 while displaying a first image (e.g., virtual reality content) on each of the two screen regions 1300 and 1301 as shown in FIG. 13. For example, the particular position may correspond to the position of the external input device included in the preview image obtained through the camera module 411.

According to various embodiments, the electronic device 400 (e.g., the processor 401) may process the preview image to be semi-transparent and map the semi-transparent preview image onto virtual reality content and display the same.

In operation 904, the electronic device 400 (e.g., the processor 401) may transfer a scan response request signal to at least one external input device.

In operation 905, the electronic device 400 (e.g., the processor 401) may receive a response signal from at least one external input device. The response signal may contain information indicating whether the user's input or biometric authentication information is sensed.

In operation 906, the electronic device 400 (e.g., the processor 401) may determine whether a response signal containing sensing information is received and, if a sensing information-containing response signal is received, perform operation 907. In a case where a response signal containing non-sensing information is received, the electronic device 400 (e.g., the processor 401) may perform operation 904 to transfer a scan response request signal to at least one external input device.

In operation 907, the electronic device 400 (e.g., the processor 401) may perform connection with an external input device which has transmitted a corresponding response signal. For example, upon receiving a sensing signal from a first external input device, the electronic device 400 (e.g., the processor 401) may perform connection with the first external input device.

In operation 908, the electronic device 400 (e.g., the processor 401) may switch to the virtual reality mode.

Figure 14:
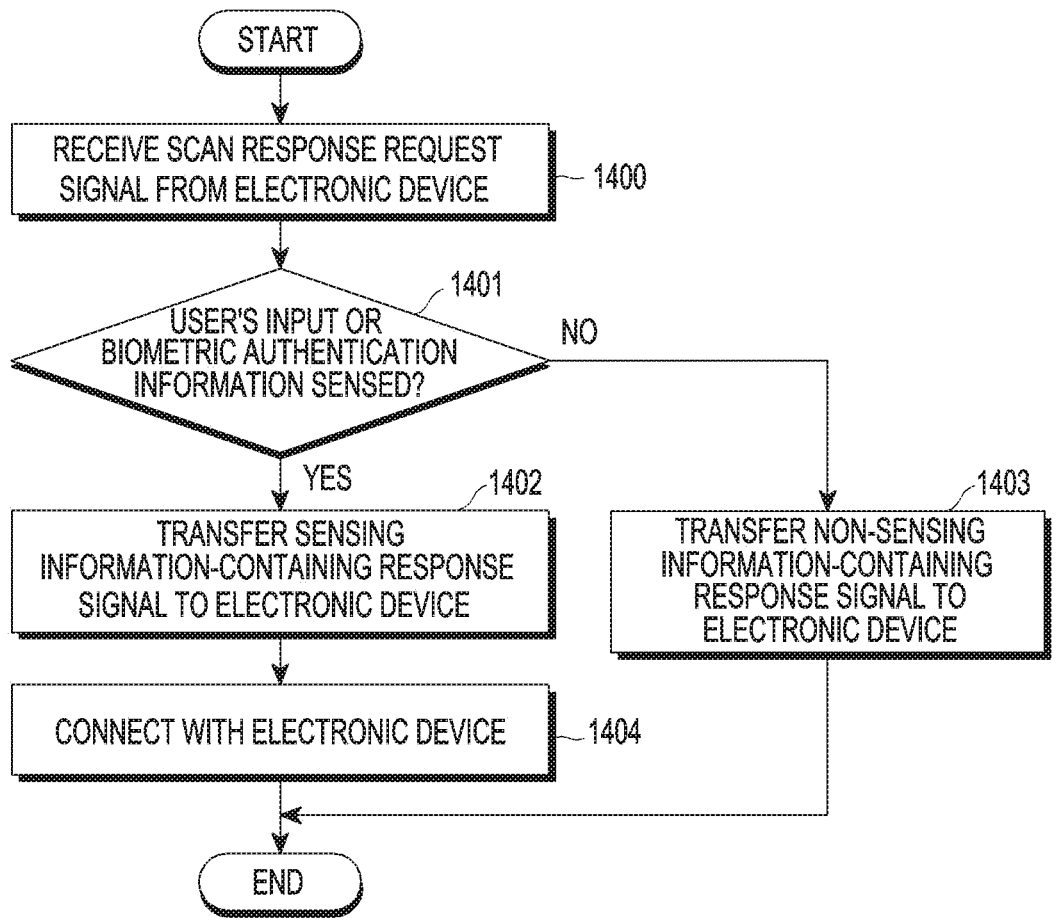
FIG. 14 is a flowchart for an external electronic device to perform connection with an electronic device according to various embodiments.

FIG. 14 is a flowchart for an external electronic device to perform connection with an electronic device according to various embodiments.

According to various embodiments, operations 1400 to 1404 may be performed by any one of electronic devices 101, 102, 104, 201, or 400, a server 106, processors 120, 210, 401, or 601, a program module 310, and/or an external input device 600.

Referring to FIG. 14, an external input device 600 (e.g., the processor 601) may receive a scan response request signal from the electronic device 400 in operation 1400.

In operation 1401, the external input device 600 (e.g., the processor 601) may determine whether the user's input or biometric authentication information is sensed and, if the user's input or biometric authentication information is determined to be sensed, perform operation 1402 to transfer a response signal containing sensing information to the electronic device 400. If the user's input or biometric authentication information is not determined to be sensed, the external input device 600 (e.g., the processor 601) may transfer a response signal containing non-sensing information to the electronic device 400 in operation 1403.

Figure 15A:
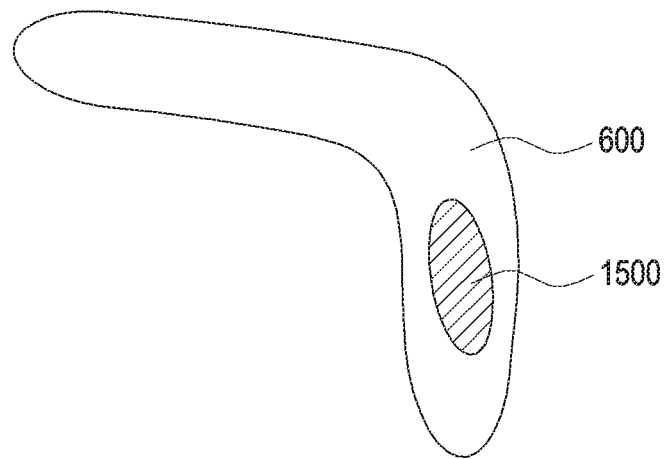
FIGS. 15A, 15B, 15C, 15D, and 15E are views illustrating examples for describing operations according to whether an external electronic device senses an object according to various embodiments.
Figure 15B:
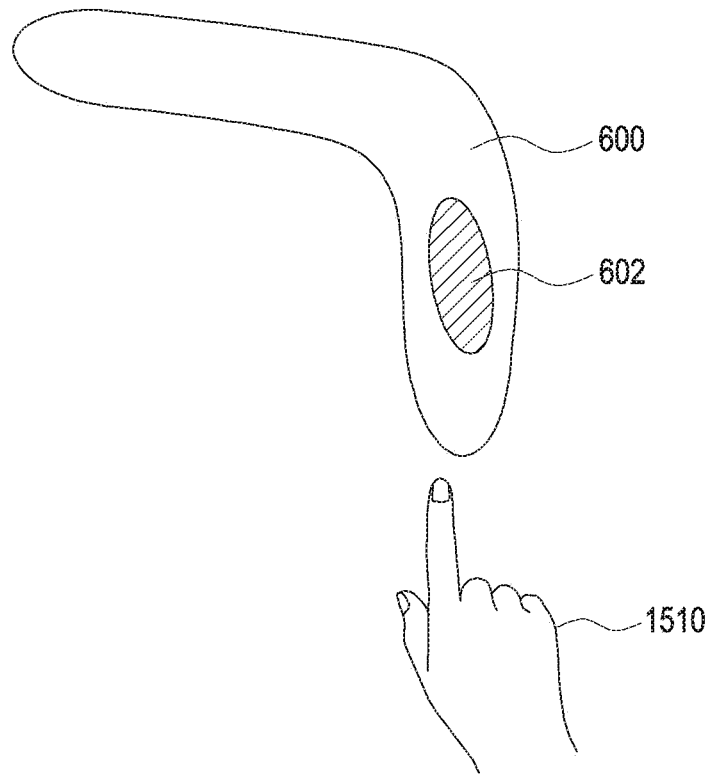

For example, referring to FIGS. 15A and 15B, the external input device 600 (e.g., the processor 601) may determine whether the user's finger or hand 1510 is sensed using one sensor 1500 included in the sensor module 602. In a case where the user's finger or hand 1510 is not sensed through one sensor 1510 included in the sensor module 602 as shown in FIG. 15A, the external input device 600 (e.g., the processor 601) may periodically output signals containing information (e.g., [10111]) indicating that the finger or hand 1510 is not sensed (e.g., an abnormal grip). In a case where the user's finger or hand 1510 is sensed through one sensor 1500 included in the sensor module 602 as shown in FIG. 15B, the external input device 600 may periodically output signals containing information (e.g., [1111]) indicating that the finger or hand 1510 is sensed (e.g., a normal grip).

Figure 15C:
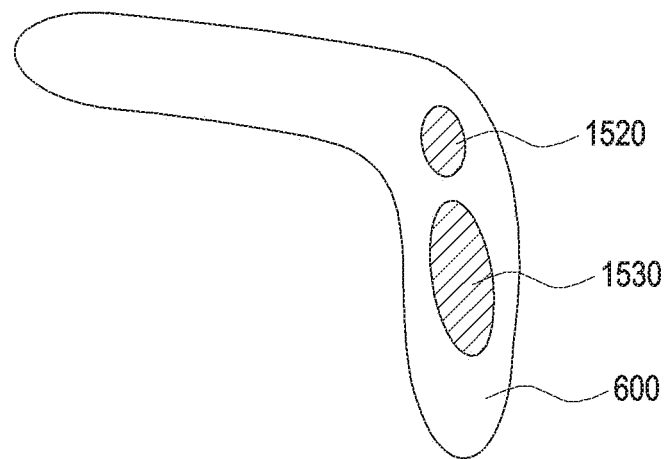
Figure 15D:
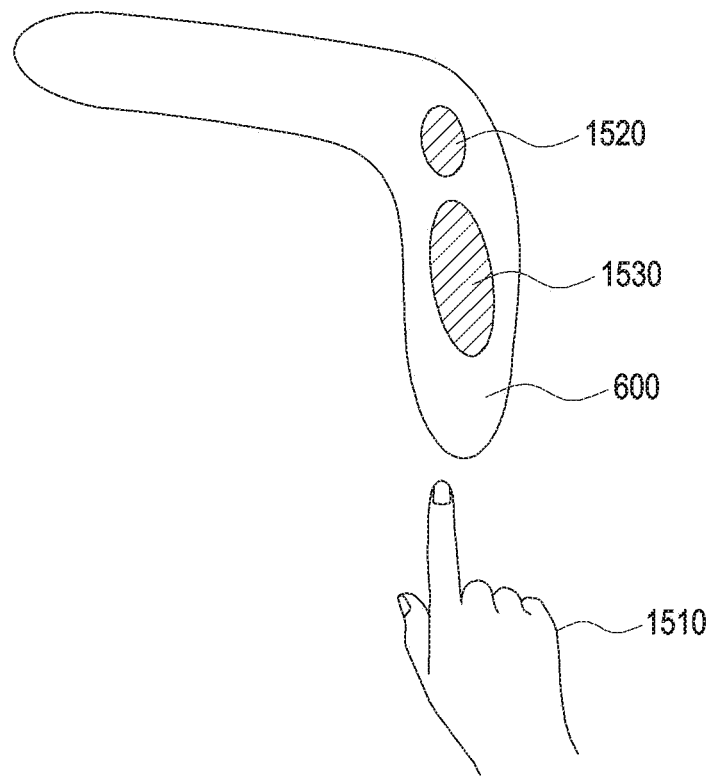
Figure 15E:
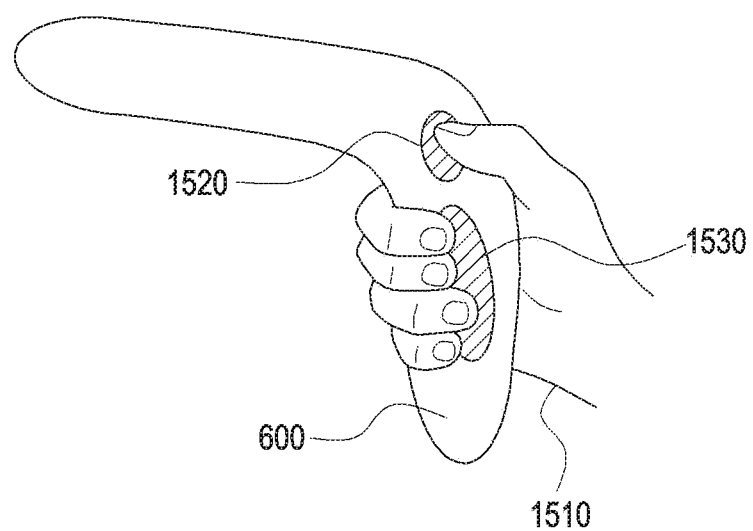

Referring to FIGS. 15c, 15d, and 15e, the external input device 600 may also use a plurality of sensors 1520 and 1530 included in the sensor module 602 to determine whether the user's finger or hand 1510 is sensed.

In a case where the user's finger or hand 1510 is not sensed through the plurality of sensors 1520 and 1530 included in the sensor module 602 as shown in FIG. 15c, the external input device 600 (e.g., the processor 601) may periodically output signals containing information (e.g., [10111]) indicating that the user's finger or hand 1510 is not sensed (e.g., an abnormal grip).

In a case where the user's finger or hand 1510 is sensed through any one (e.g., a first sensor 1510 or a second sensor 1530) of the plurality of sensors 1520 and 1530 included in the sensor module 602 as shown in FIG. 15d, the external input device 600 (e.g., the processor 601) may determine that the user's finger or hand 1510 is not sensed and periodically output signals containing information (e.g., [10111]) indicating that the user's finger or hand 1510 is not sensed (e.g., an abnormal grip). Further, the external input device 600 (e.g., the processor 601) may output voice to indicate (or guide) that the finger or hand 1510 is sensed neither through the first sensor 1520 nor through second sensor 1530 (e.g., an abnormal grip).

In a case where the user's finger or hand 1510 is sensed through all of the plurality of sensors 1520 and 1530 included in the sensor module 602 as shown in FIG. 15e, the external input device 600 (e.g., the processor 601) may periodically output signals containing information (e.g., [1111]) indicating that the user's finger or hand 1510 is sensed (e.g., a normal grip).

In operation 1404, the external input device 600 (e.g., the processor 601) may perform connection with the electronic device 400.

FIGS. 16A and 16B are views illustrating examples of creating a table of at least one piece of external input data stored in a memory of an electronic device according to various embodiments.

Referring to FIGS. 16A and 16B, the electronic device 400 may receive raw data (e.g., 0x00110110) indicating a non-sensing of the user's input or biometric authentication information from a Bluetooth keyboard, a Bluetooth mouse, a right Bluetooth motion controller, and a left Bluetooth motion controller as shown in FIG. 16A and store the raw data in the memory 403.

According to an embodiment, upon sensing the user's input or biometric authentication information to the right Bluetooth motion controller, the electronic device 400 may receive raw data (e.g., 0x11110111) indicating a sensing of the user's input or biometric authentication information from the right Bluetooth motion controller and store the raw data in the memory 403 as shown in FIG. 16B.

Figure 17A:
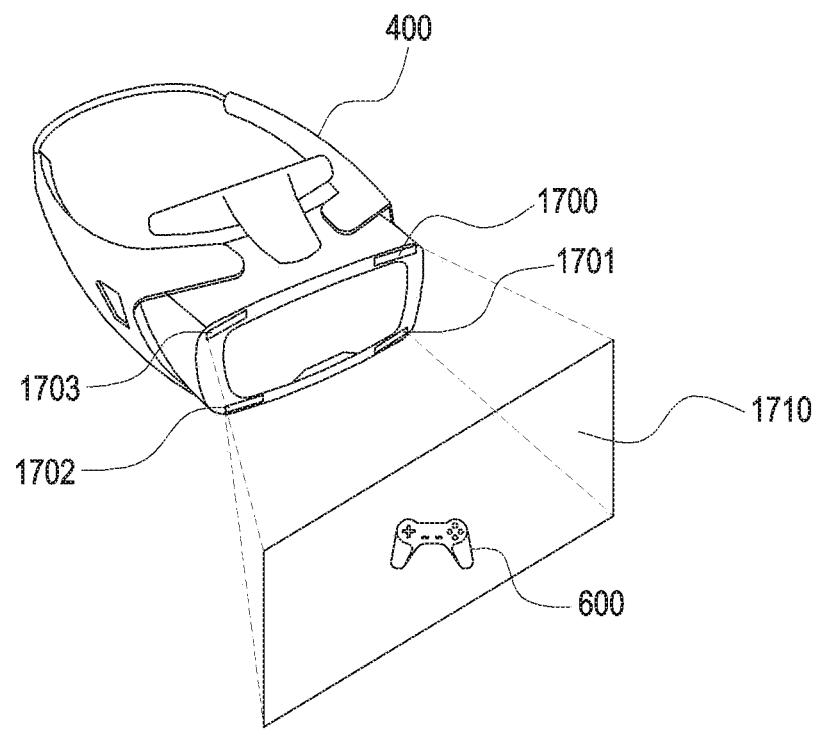
FIGS. 17A and 17B are views illustrating example electronic devices according to various embodiments.
Figure 17B:
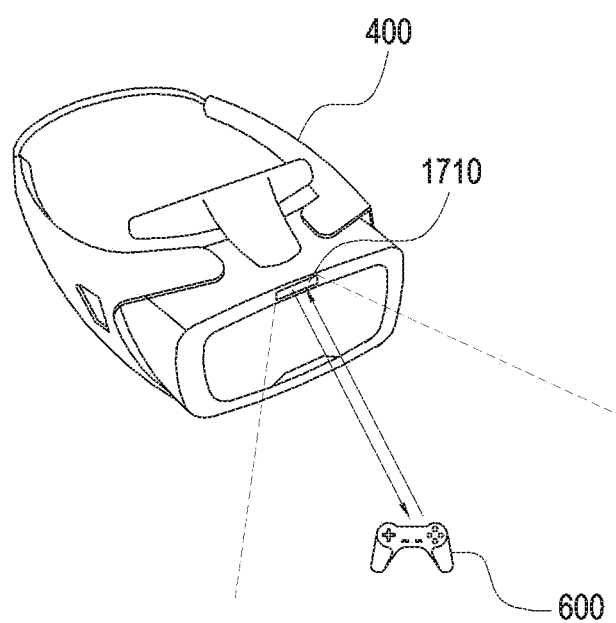

FIGS. 17A and 17B are views illustrating example electronic devices according to various embodiments.

Referring to FIGS. 17A and 17B, the electronic device 400 may have a plurality of antennas 1700, 1701, 1702, and 1703 as shown in FIG. 17A. If the user's wearing is sensed or content for input on the external input device 600 in the virtual reality mode is displayed, the electronic device 400 may form an initial beam region for scanning using the plurality of antennas according to the direction of the electronic device 400. Upon sensing a signal from at least one external input device in the formed initial beam region (e.g., a first beam region), the processor 401 may enter into the see-through mode. Unless a signal from at least one external input device is sensed in the initial beam region, the electronic device 400 may detect the FOV according to the direction of the user's gaze and form a beam in a particular region 1700 corresponding to the detected FOV. For example, the electronic device 400 may intensively output beam signals to the particular region, forming a beam region (e.g., a beamforming region). If a signal from the external input device 600 is sensed in the beam region, the electronic device 400 may perform connection with the external input device 600. A signal from the external input device 600 may contain information about connection with the external input device 600.

According to an embodiment, the electronic device 400 may have an infrared sensor and an LED 1610 as shown in FIG. 17B. Upon sensing the user's wearing, the electronic device 400 may enter into the virtual reality mode and display virtual reality content. If a menu for using the external input device 600 is selected or content is selected, the electronic device 400 may switch to the see-through mode, measure the direction of the user's gaze, and output infrared signals in the measured direction of gaze. Upon receiving a response signal from the external input device 600 in response to the infrared signal, the electronic device 400 may perform connection with the external input device 600. The response signal may contain information about connection with the external input device 600.

Figure 18:
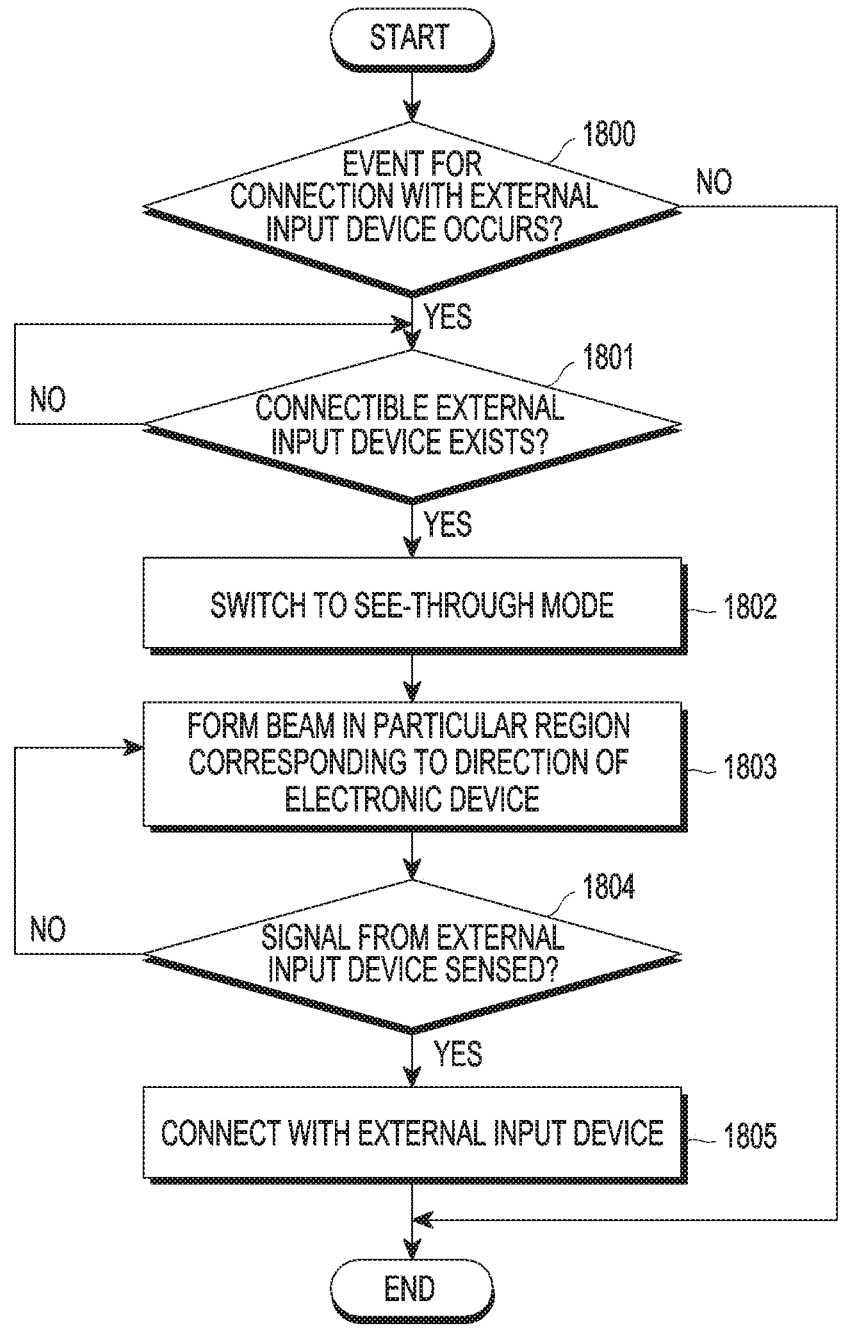
FIG. 18 is a flowchart illustrating connection of an electronic device with an external electronic device according to various embodiments.

FIG. 18 is a flowchart illustrating connection of an electronic device with an external electronic device according to various embodiments.

According to various embodiments, operations 1800 to 1805 may be performed by any one of electronic devices 101, 102, 104, 201, or 400, a server 106, processors 120, 210, 401, or 601, a program module 310, and an external input device 600.

Referring to FIG. 18, the electronic device 400 (e.g., the processor 401) may determine whether an event for connection with an external input device occurs in operation 1800. If such an event occurs, the electronic device 400 (e.g., the processor 401) may perform operation 1801 and, if not, terminate the operation. According to an embodiment, if the user's wearing of the electronic device 400 is sensed or content for connection to an external input device is displayed in the virtual reality mode, the electronic device 400 (e.g., the processor 401) may determine that the event occurs.

In operation 1801, the electronic device 400 (e.g., the processor 401) may determine whether there is a connectable external input device and, if there is determined to be a connectable external input device, perform operation 1802 and, if there is not determined to be a connectable external input device, determine whether there is a connectable external input device in operation 1801. According to an embodiment, upon receiving a signal (e.g., an advertising signal) for at least one external input device, the electronic device 400 (e.g., the processor 401) may determine that there is a connectable external input device.

In operation 1802, the electronic device 400 (e.g., the processor 401) may switch to a see-through mode.

In operation 1803, the electronic device 400 (e.g., the processor 401) may form a beam (or beam region) in a particular region corresponding to the direction of the electronic device 400.

According to various embodiments, the electronic device 400 (e.g., the processor 401) may form an initial beam region for scanning using a plurality of antennas according to the direction of the electronic device 400. Upon sensing a signal from at least one external input device in the formed initial beam region (e.g., a first beam region), the processor 401 may enter into the see-through mode. For example, the beam region initially formed (e.g., a first beam region) may be determined or fixed depending on the position or direction of the electronic device 400. The electronic device 400 (e.g., the processor 401) may detect the FOV according to the direction of the user's gaze and intensively output beam signals to the particular region corresponding to the detected FOV to thereby form a beam region (e.g., a second beam region). For example, if no signal from the external input device is sensed in the first beam region, the electronic device 400 (e.g., the processor 401) may form a second beam region.

In operation 1804, the electronic device 400 (e.g., the processor 401) may determine whether a response signal is received from the external input device 600 and, if a response is received from the external input device 600, perform operation 1805 and, if no response signal is received from the external input device 600, form a beam in the particular region corresponding to the direction of the electronic device in operation 1803.

According to an embodiment, if no response signal is received from the external input device 600 in the particular region, the electronic device 400 (e.g., the processor 401) may output a voice or image to indicate that the external input device 600 is not in the particular region so that the user moves his gaze to other region.

In operation 1805, the electronic device 400 (e.g., the processor 401) may connect with the external input device 600.

Figure 19:
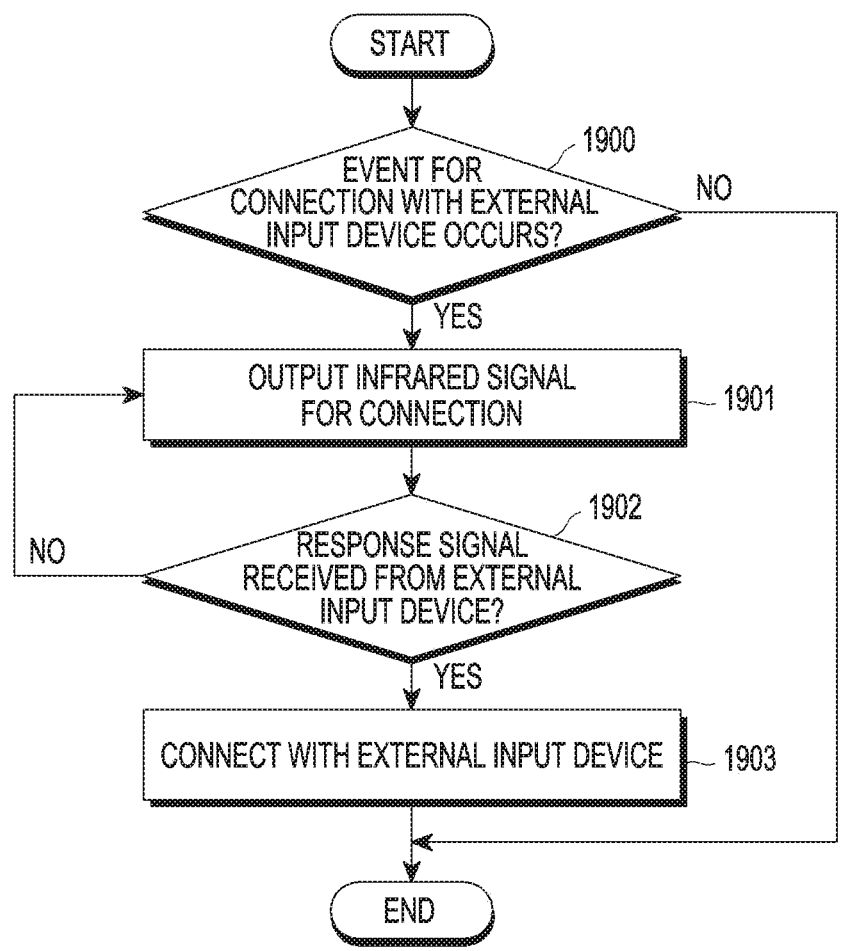
FIG. 19 is a flowchart illustrating connection of an electronic device with an external electronic device according to various embodiments.

FIG. 19 is a flowchart illustrating connection of an electronic device with an external electronic device according to various embodiments.

According to various embodiments, operations 1900 to 1903 may be performed by any one of electronic devices 101, 102, 104, 201, or 400, a server 106, processors 120, 210, 401, or 601, a program module 310, and an external input device 600.

Referring to FIG. 19, the electronic device 400 (e.g., the processor 401) may determine whether an event for connection with an external input device occurs in operation 1900. If such an event occurs, the electronic device 400 (e.g., the processor 401) may perform operation 1801 and, if not, terminate the operation.

In operation 1901, the electronic device 400 (e.g., the processor 401) may output an infrared signal for connection. According to an embodiment, the electronic device 400 (e.g., the processor 401) may output an infrared signal corresponding to the direction of the electronic device 400.

In operation 1902, the electronic device 400 (e.g., the processor 401) may determine whether a response signal is received from the external input device 600 and, if a response is received from the external input device 600, perform operation 1803 and, if no response signal is received from the external input device 600, output an infrared signal for connection in the direction of the user's gaze in operation 1802.

In operation 1903, the electronic device 400 (e.g., the processor 401) may perform connection with the external input device 600.

Figure 20:
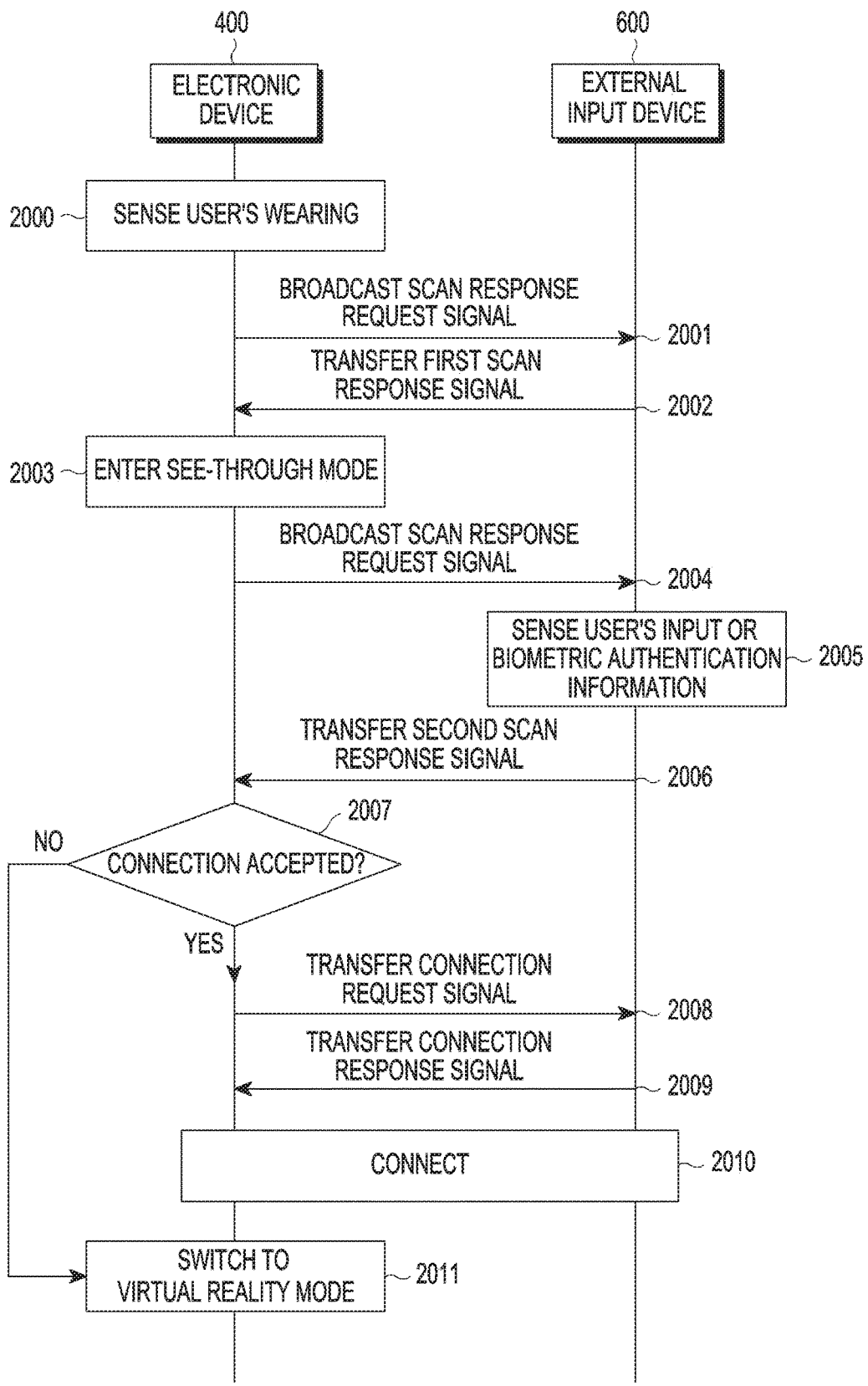
FIG. 20 is a flowchart illustrating connection between an electronic device and an external electronic device according to various embodiments.

FIG. 20 is a flowchart illustrating connection between an electronic device and an external electronic device according to various embodiments.

According to various embodiments, the electronic device 400 and the external input device 600 may perform a connection operation using a Bluetooth (BT) scheme.

Referring to FIG. 20, the electronic device 400 may sense the user's wearing of the electronic device 400 in operation 1900.

In operation 2001, the electronic device 400 may broadcast scan response request signals.

In operation 2002, the external input device 600 may transfer a first scan response signal to the electronic device 400 in response to the scan response request signal. For example, the first scan response signal may be a response signal containing non-sensing information which indicates that the user's input or biometric authentication information is not sensed.

In operation 2003, the electronic device 400 may enter into the see-through mode and, in operation 2004, transfer a scan response request signal to the external input device 600.

If the user's input or biometric authentication information is sensed in operation 2005, the external input device 600 may, in operation 2006, transfer a second scan response signal to the electronic device 400 in response to the scan response request signal. For example, the second scan response signal may be a response signal containing sensing information which indicates that the user's input or biometric authentication information is sensed.

In operation 2007, the electronic device 400 may determine whether connection is accepted and, if accepted, perform operation 2008 but, if not accepted, operation 2011. For example, the electronic device 400 may determine whether an input (e.g., button input or touch input) to accept connection is received or a gesture (e.g., a nodding gesture) to accept connection is sensed and perform operation 2008 in response to the input or gesture to accept connection.

In operation 2008, the electronic device 400 may transfer a connection request signal to the external input device 600. In operation 2009, the external input device 600 may transfer a connection response signal to the electronic device 400.

In operation 2010, the electronic device 400 and the external input device 600 may perform connection.

In operation 2011, the electronic device 400 may switch to the virtual reality mode.

Figure 21:
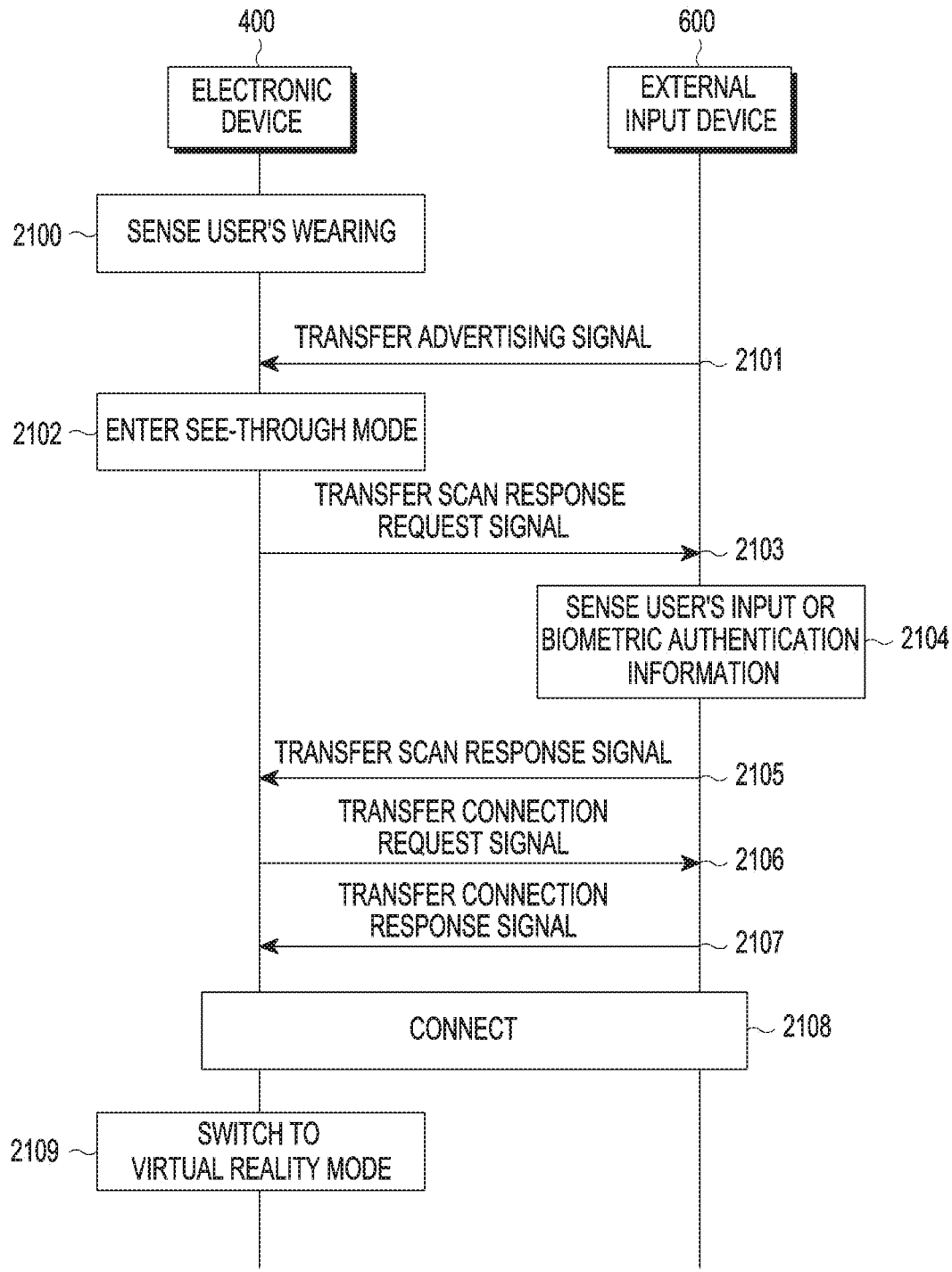
FIG. 21 is a flowchart illustrating connection between an electronic device and an external electronic device according to various embodiments.

FIG. 21 is a flowchart illustrating connection between an electronic device and an external electronic device according to various embodiments.

According to various embodiments, the electronic device 400 and the external input device 600 may perform a connection operation using a Bluetooth low energy (BLE) scheme. In this case, the external input device 600 may periodically broadcast advertising signals.

Referring to FIG. 21, the electronic device 400 may sense the user's wearing of the electronic device 400 in operation 2100.

In operation 2101, the external input device 600 may broadcast advertising signals. According to an embodiment, the advertising signal may contain information indicating whether the user's input or biometric authentication information is sensed. For example, in a case where the user's input or biometric authentication information is not sensed, the advertising signal may contain non-sensing information which indicates that the user's input or biometric authentication information is not sensed (e.g., non-sensing of the user's input or non-sensing of biometric authentication information).

In operation 2102, the electronic device 400 may enter into the see-through mode.

In operation 2103, the electronic device 400 may transfer a scan response request signal to the external input device 600.

If the user's input or biometric authentication information is sensed in operation 2104, the external input device 600 may, in operation 2105, transfer a scan response signal in response to the scan response request signal. For example, the scan response signal may contain sensing information which indicates that the user's input or biometric authentication information is sensed.

In operation 2106, the electronic device 400 may transfer a connection request signal to the external input device 600 if a scan response signal is received. In operation 2107, the external input device 600 may transfer a connection response signal to the electronic device 400 in response to the connection request signal.

In operation 2108, the electronic device 400 and the external input device 600 may perform connection.

In operation 2109, the electronic device 400 may switch to the virtual reality mode.

Figure 22:
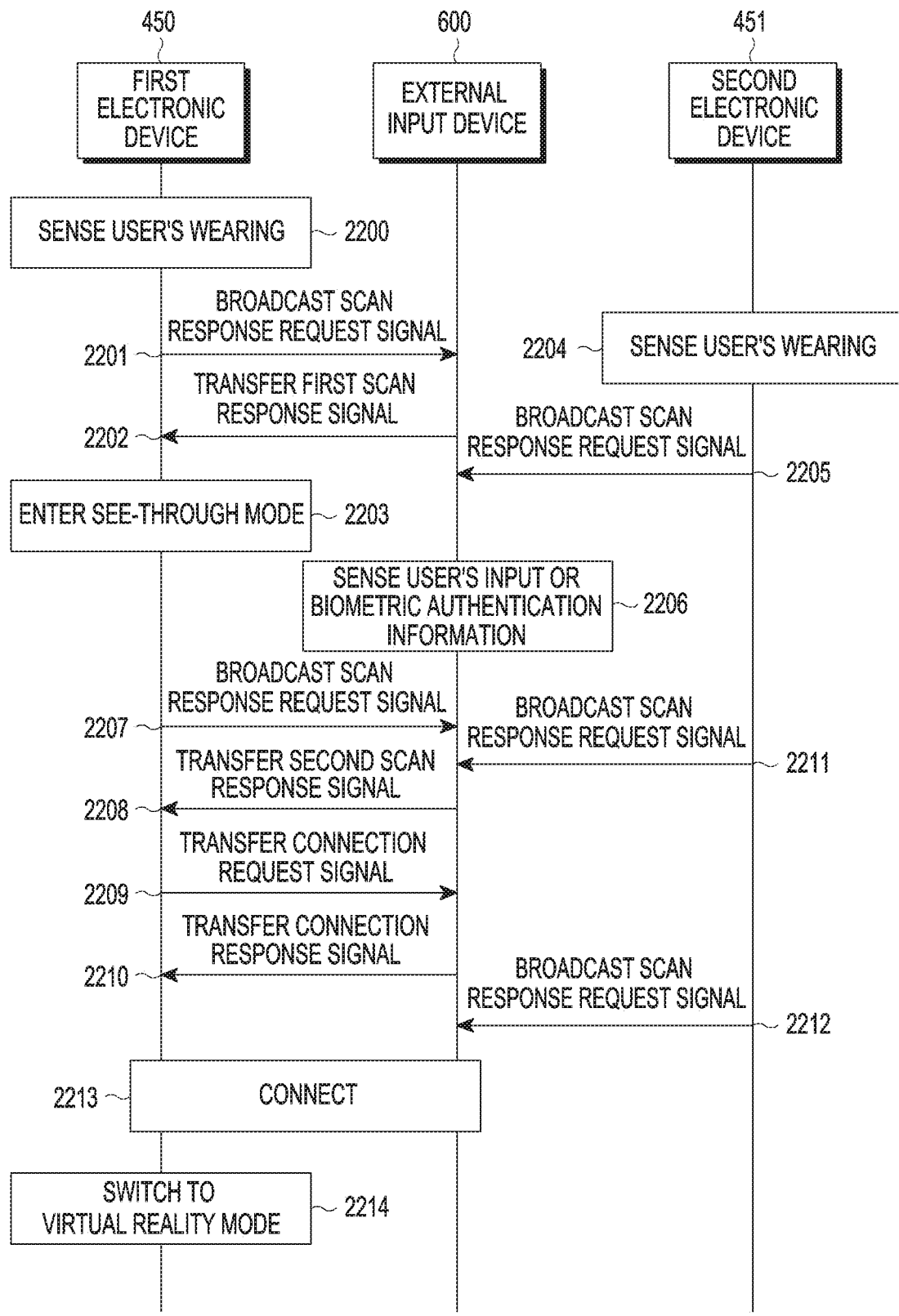
FIG. 22 is a flowchart illustrating connection between a first electronic device, a second electronic device, and an external input device according to various embodiments.

FIG. 22 is a flowchart illustrating connection between a first electronic device, a second electronic device, and an external input device according to various embodiments.

According to various embodiments, a first electronic device 450, a second electronic device 451, and the external input device 600 may perform a connection operation using a BT scheme.

Referring to FIG. 22, the first electronic device 450 may sense the user's wearing of the first electronic device 450 in operation 2200.

In operation 2201, the first electronic device 450 may broadcast scan response request signals.

In operation 2202, the external input device 600 may transfer a first scan response signal in response to the scan response request signal. For example, the first scan response signal may contain non-sensing information which indicates that the user's input or biometric authentication information is not sensed.

In operation 2203, the first electronic device 450 may enter into the see-through mode.

In operation 2204, the second electronic device 451 may sense the user's wearing of the second electronic device 451.

In operation 2205, the second electronic device 451 may broadcast scan response request signals. According to an embodiment, since the external input device 600 first receives a scan response request signal from the first electronic device 450, the external input device 600 may not respond to the scan response request signal from the second electronic device 451.

In operation 2206, the external input device 600 may sense the user's input or biometric authentication information.

In operation 2207, the first electronic device 450 may transfer a scan response request signal to the external input device 600.

In operation 2208, the external input device 600 may transfer a second scan response signal to the first electronic device 450 in response to the scan response request signal. For example, the second scan response signal may contain sensing information which indicates that the user's input or biometric authentication information is sensed.

In operation 2209, the first electronic device 450 may transfer a connection request signal to the external input device 600. In operation 2210, the external input device 600 may transfer a connection response signal to the first electronic device 450. For example, the connection request signal may contain information (e.g., device information and access information) used for connection with the first electronic device 450, and the connection response signal may contain information used for connection with the external input device 451.

In operations 2211 and 2212, the second electronic device 451 may continue to broadcast scan response request signals but the external input device 600 may not respond although receiving the scan response request signal.

In operation 2213, the first electronic device 450 may perform connection with the external input device 600.

In operation 2214, the first electronic device 450 may switch to the virtual reality mode.

Figure 23:
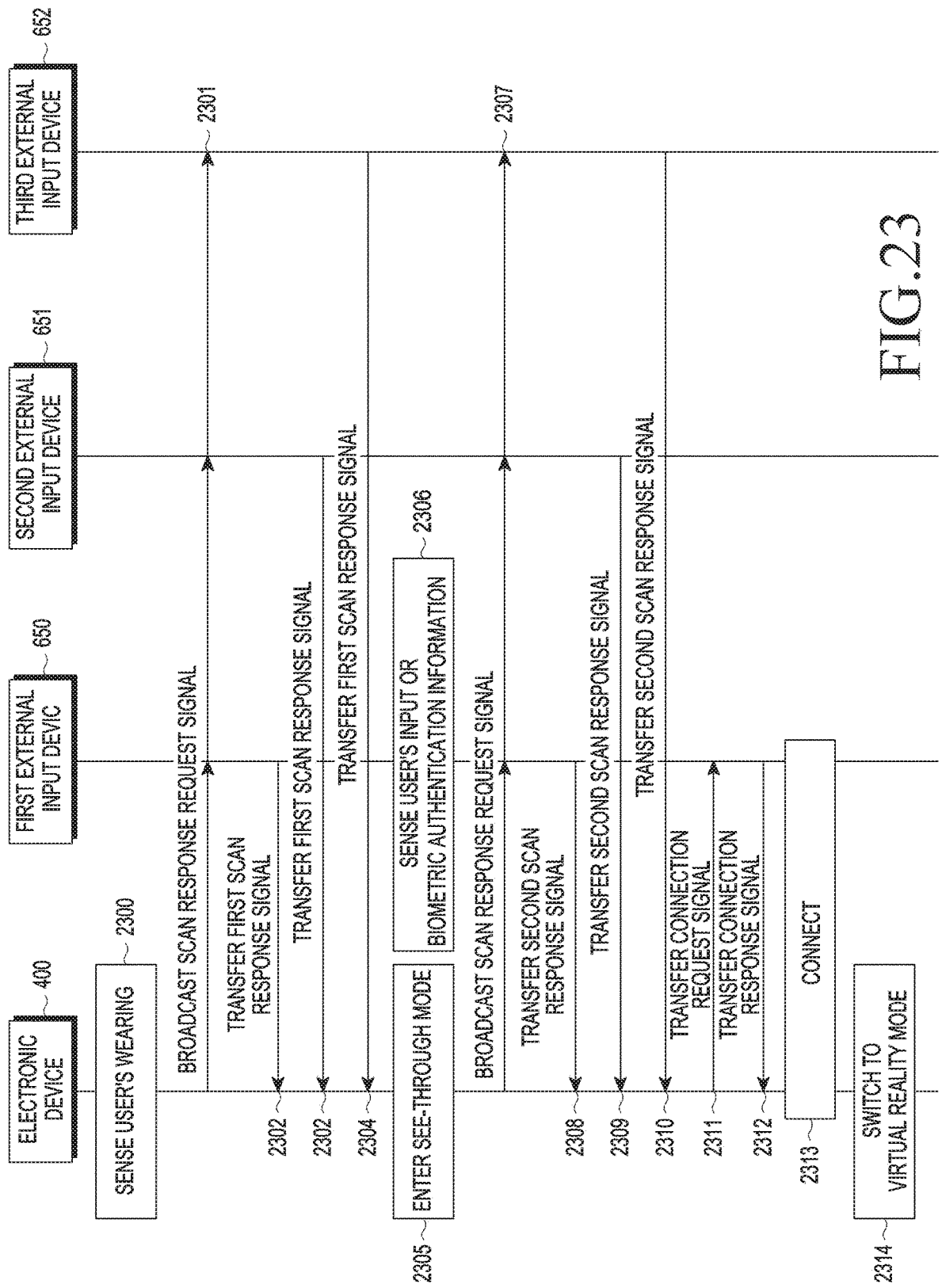
FIG. 23 is a flowchart illustrating connection between an electronic device, a first external input device, a second external input device, and a third external input device according to various embodiments.

FIG. 23 is a flowchart illustrating connection between an electronic device, a first external input device, a second external input device, and a third external input device according to various embodiments.

According to various embodiments, an electronic device 400, a first external input device 650, a second external input device 651, and a third external input device 652 may perform a connection operation using a BT scheme.

In operation 2300, the electronic device 400 may sense the user's wearing and, in operation 2301, broadcast scan response request signals. For example, the first external input device 650, the second external input device 651, and the third external input device 652 may receive a scan response request signal from the electronic device 400.

In operations 2302, 2303, and 2304, the first external input device 650, the second external input device 651, and the third external input device 652 may transfer first scan response signals to the electronic device 400. For example, the first scan response signals may contain non-sensing information which indicates that the user's input or biometric authentication information is not sensed.

In operation 2305, the electronic device 400 may enter into the see-through mode.

In operation 2306, the first external input device 650 may sense the user's input or biometric authentication information.

In operation 2307, the electronic device 400 may broadcast scan response request signals. According to an embodiment, the electronic device 400 may periodically broadcast scan response request signals.

In operation 2308, the first external input device 650 may transfer a second scan response signal to the electronic device 450. For example, the second scan response signal may contain sensing information which indicates that the user's input or biometric authentication information is sensed.

In operations 2309 and 2310, the first external input device 650, the second external input device 651, and the third external input device 652 may transfer first scan response signals to the electronic device 400.

In operation 2311, the electronic device 400 may transfer a connection request signal to the first external input device 650. The first external input device 650 may transfer a connection response signal to the electronic device 450.

In operation 2313, the electronic device 400 may perform connection with the first external input device 650.

In operation 2314, the electronic device 400 may switch to the virtual reality mode.

Figure 24:
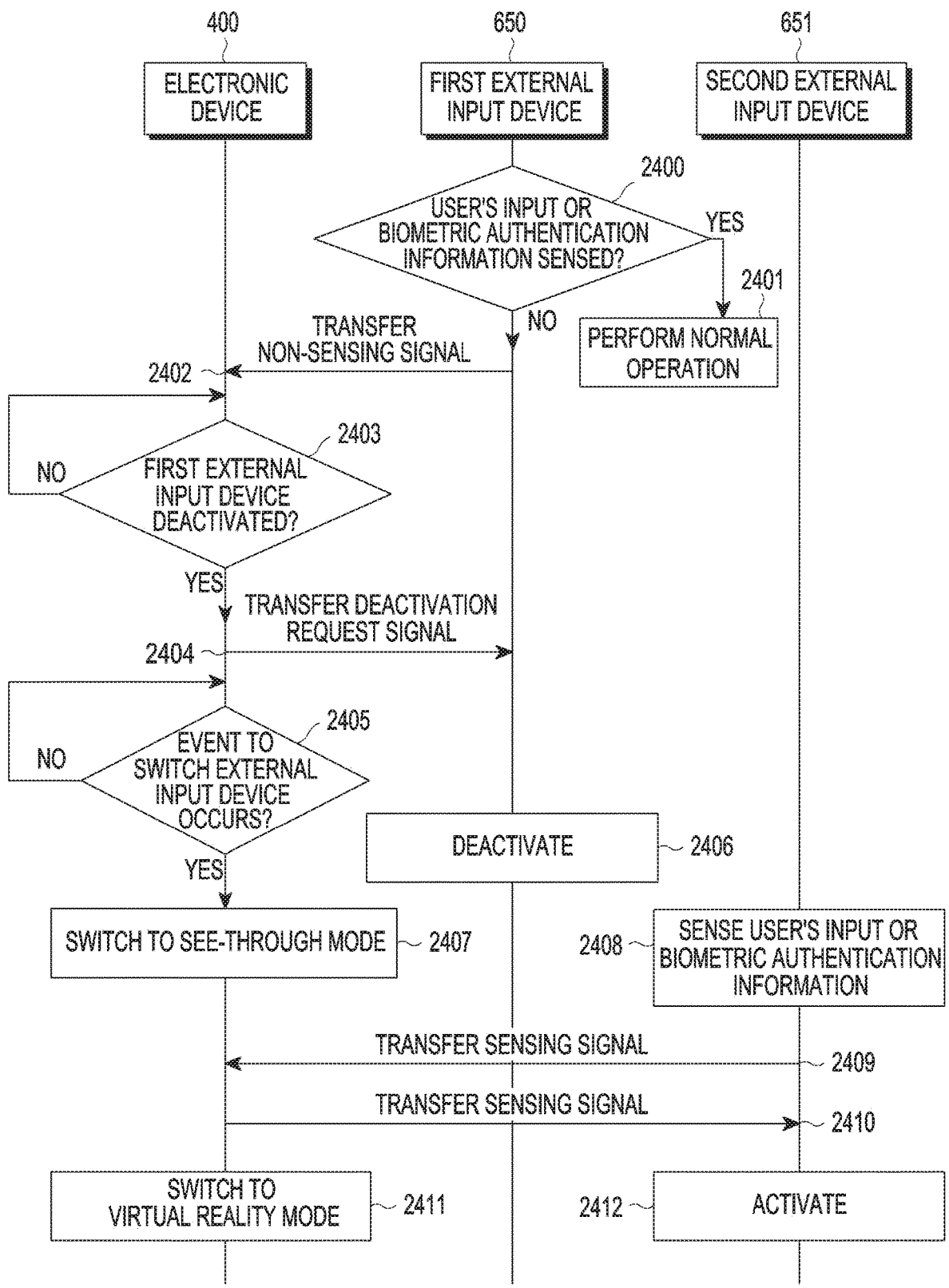
FIG. 24 is a flowchart illustrating a switch between a first external input device and a second external input device connected with an electronic device according to various embodiments.

FIG. 24 is a flowchart illustrating a switch between a first external input device and a second external input device connected with an electronic device according to various embodiments.

For example, the electronic device 400 may be connected with the first external input device 650 and the second external input device 651, the first external input device 650 may be activated so that the user's input or biometric authentication information is sensed, and the second external input device 651 may remain inactive.

In operation 2400, the first external input device 650 may determine whether the user's input or biometric authentication information is sensed and, if the user's input or biometric authentication information is sensed, perform a normal operation in operation 2401 and, if the user's input or biometric authentication information is not sensed, transfer a non-sensing signal to the electronic device 400 in operation 2402. According to various embodiments, the first external input device 650 may terminate the connection with the electronic device 400 if the user's input or biometric authentication information is not sensed.

In operation 2403, the electronic device 400 may determine whether to deactivate the first external input device 650 and, upon determining to deactivate the first external input device 650, perform operation 2404 and, upon determining not to deactivate the first external input device 650, determine whether to deactivate the first external input device 650 in operation 2403.

In operation 2404, the electronic device 400 may transfer a deactivation request signal to the first external input device 650 connected. For example, the electronic device 400 may transfer a deactivation request signal to the first external input device 650 immediately when receiving a non-sensing signal or if the reception of non-sensing signals continues during a particular time.

In operation 2405, the first external input device 650 may be deactivated by the deactivation request signal.

In operation 2406, the electronic device 400 may determine whether an event to switch to an external input device occurs and, if an event to switch to the external input device occurs, switch to the see-through mode in operation 2407 and, if such an event does not occur, determine whether such an event occurs in operation 2406. For example, the event to switch to the external input device may include a case where the user needs text entry while using a gesture controller for receiving gesture input. Upon receiving a non-sensing signal indicating that the user's gesture is not sensed from the gesture controller or no input signal (e.g., touch or grip) from the gesture controller is sensed, the electronic device 400 may switch to the see-through mode and broadcast scan response request signals. Upon receiving a response signal containing sensing information indicating that the user's input (e.g., touch) or biometric authentication information is sensed from a new external input device (e.g., a keyboard) in response to the scan response request signal, the electronic device 400 may perform connection with the new external input device and, after the connection is complete, switch to the virtual reality mode.

In operation 2408, the second external input device 651 may sense the user's input or biometric authentication information.

In operation 2409, the second external input device 651 may transfer a sensing signal to the electronic device 400.

In operation 2410, the electronic device 400 may transfer an activation request signal to the second external input device 651 in response to the sensing signal.

In operation 2411, the second external input device 651 may be activated in response to the activation request signal.

In operation 2412, the electronic device 400 may switch to the virtual reality mode for entry using the second external input device 651.

Figure 25:
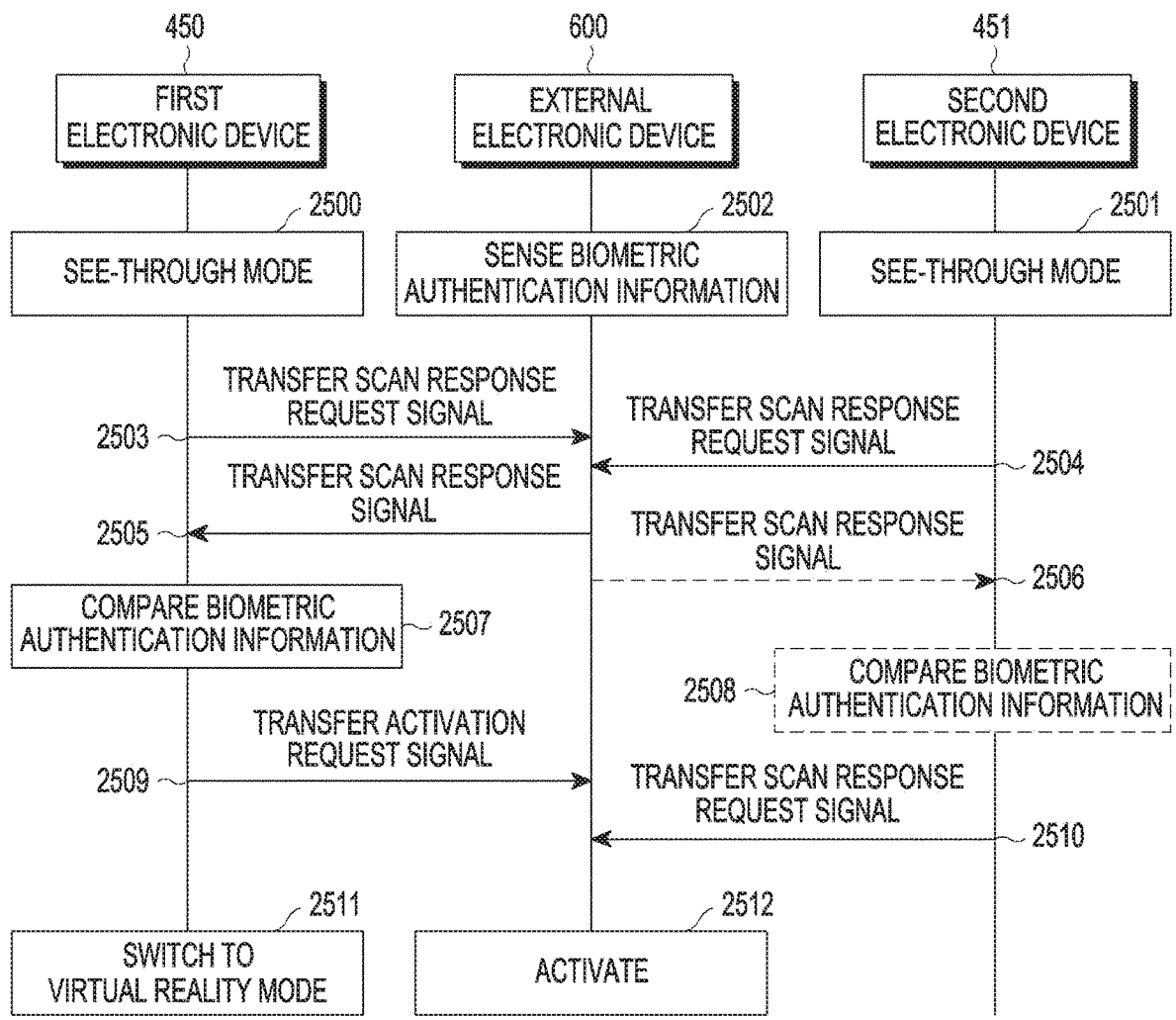
FIG. 25 is a flowchart illustrating connection between a first electronic device, a second electronic device, and an external input device according to various embodiments.

FIG. 25 is a flowchart illustrating connection between a first electronic device, a second electronic device, and an external input device according to various embodiments.

According to various embodiments, the external input device 600 may connect with the first electronic device 450 to store biometric authentication information about the first electronic device 450 and may connect with the second electronic device 451 to store biometric authentication information about the second electronic device 451.

Referring to FIG. 25, the first electronic device 450 may discover the external input device 600 and enter into the see-through mode in operation 2500 and, in operation 2501, the second electronic device 451 may discover the external input device 600 and enter to the see-through mode.

In operation 2502, the external input device 600 may sense biometric authentication information. For example, the biometric authentication information may include a fingerprint or iris pattern.

In operation 2503, the first electronic device 450 may transfer a scan response request signal to the external input device 600 and, in operation 2504, the second electronic device 451 may transfer a scan response request signal to the external input device 600.

Upon receiving the scan response request signals from the first electronic device 450 and the second electronic device 451, the external input device 600 may transfer a scan response signal to the first electronic device 450 in operation 2505 and transfer a scan response signal to the second electronic device 451 in operation 2506. The scan response signals may contain biometric authentication information.

In operation 2507, the first electronic device 450 may perform comparison on the biometric authentication information. The first electronic device 450 may compare the user's biometric authentication information stored in the first electronic device 450 with the biometric authentication information received from the external input device 600. For example, the first electronic device 450 may determine whether the stored biometric authentication information and the received biometric authentication information correspond to the same user.

In operation 2508, the second electronic device 451 may perform comparison on the biometric authentication information. The second electronic device 451 may compare the user's biometric authentication information stored in the second electronic device 451 with the biometric authentication information received from the external input device 600. For example, the second electronic device 451 may determine whether the stored biometric authentication information and the received biometric authentication information correspond to the same user.

If the stored biometric authentication information and the received biometric authentication information correspond to the same user, the first electronic device 450 may transfer an activation request signal to the external input device 600 in operation 2509. In other words, if the biometric authentication information sensed by the external input device 600 corresponds to the user of the first electronic device 450, the first electronic device 450 may activate the external input device 600 to perform entry using the external input device 600.

Unless the stored biometric authentication information and the received biometric authentication information correspond to the same user, the second electronic device 451 may broadcast scan response request signals in operation 2510. In other words, unless the biometric authentication information sensed by the external input device 600 corresponds to the user of the second electronic device 451, the second electronic device 451 may not activate the external input device 600 and thus discover another external input device or periodically transfer scan response request signals to the external input device 600.

In operation 2511, the external input device 2512 may be activated in response to the activation request signal from the first electronic device 450.

In operation 2512, the first electronic device 450 may switch to the virtual reality mode for entry using the external input device 600.

According to various embodiments, since the external input device 600 first receives the scan response request signal from the first electronic device 450, the external input device 600 may transfer a scan response signal only to the first electronic device 450. Thus, operations 2506 and 2508 may selectively be performed. For example, if no scan response signal for the scan response request signal is received from the external input device 600, the second electronic device 451 may broadcast scan response request signals in operation 2510.

According to various embodiments, there is provided a storage medium storing instructions to, when executed by at least one processor, enable the at least one processor to perform at least one operation comprising displaying an image including a left-eye image and a right-eye image on a display, determining whether there is a connectable external input device if an event for connection with an external input device occurs in relation with the image, displaying an external image obtained using a camera module on at least part of the display if there is a connectable first external input device, and performing connection with the first external input device.

According to various embodiments, there is provided a non-transitory recording medium storing instructions to execute a method of controlling an electronic device, the instructions configured to, when executed by at least one processor, enable the at least one processor to perform at least one operation comprising, upon receiving a first signal from an external electronic device, transferring a second signal according to a sensing of an object sensed through a sensor module to the external electronic device and performing connection with the external electronic device in response to a connection request from the external electronic device.

According to various embodiments, a method of operating an electronic device 400 may comprise displaying an image including a left-eye image and a right-eye image on a display, determining whether there is a connectable external input device if an event for connection with an external input device occurs in relation with the image, displaying an external image obtained using a camera module on at least part of the display if there is a connectable first external input device, and performing connection with the first external input device.

According to various embodiments, the present invention allows the user to easily find an external electronic device even while wearing an electronic device and conveniently connect the external electronic device with the electronic device.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to various embodiments, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function. The computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various embodiments may include at least one or more of the aforementioned components, omit some of them, or further include other additional components. Operations performed by modules, programming modules or other components in accordance with various embodiments may be carried out sequentially, in parallel, repeatedly or heuristically, or at least some operations may be executed in a different order or omitted or other operations may be added.

The invention claimed is:

1. An electronic device, comprising:
   a camera module;
   a communication module;
   a display;
   a non-transitory memory; and
   a processor electrically connected with the camera module, the communication module, the display, and the non-transitory memory,
   wherein the processor is configured to:
      display virtual reality content in a virtual reality mode on the display,
      identify whether a request to change an external input device is received,
      in response to identifying that the request to change the external input device is received, switch from the virtual reality mode to a see-through mode and display see-through content including an external image obtained using the camera module on at least part of the display,
      in response to receiving a first signal including biometric authentication information indicating that a user's grip is sensed through a sensor included in a first external input device, perform connection with the first external input device, and
      after the connection is complete, switch from the see-through mode to the virtual reality mode, and
   wherein the processor is further configured to output a third signal for connection corresponding to a direction of the electronic device while displaying the see-through content on at least part of the display and perform connection with the first external input device if a response signal is received from the first external input device in response to the third signal.

2. The electronic device of claim 1, wherein the processor is configured to broadcast a second signal to at least one external input device and display the see-through content on at least part of the display upon receiving a response signal according to a sensing of an input or a sensing of the biometric authentication information in response to the second signal from the first external input device.

3. The electronic device of claim 1, wherein the processor is configured to detect a direction of a user's gaze while displaying the virtual reality content, form a beam region corresponding to the detected direction of gaze, and perform connection with the first external input device if a connection signal for the first external input device is sensed in the formed beam region.

4. The electronic device of claim 1, wherein the processor is configured to measure and store a user's biometric authentication information, transfer a connection request signal to the first external input device, if a connection response signal containing biometric authentication information is received from the first external input device, compare the stored biometric authentication information with the received biometric authentication information, and if the stored biometric authentication information matches the received biometric authentication information, perform connection with the first external input device.

5. The electronic device of claim 4, wherein the processor is configured to, upon receiving a fourth signal according to a non-sensing of the user's input or a non-sensing of biometric authentication information from the first external input device, deactivate the first external input device and display the see-through content on at least part of the display.

6. The electronic device of claim 5, wherein the processor is configured to perform connection with a second external input device upon receiving the fourth signal according to a sensing of the user's input or biometric authentication information from the second external input device.

7. A non-transitory recording medium storing instructions to execute a method of controlling an electronic device, the instructions configured to, when executed by at least one processor, enable the at least one processor to perform at least one operation, the at least one operation comprising:

displaying virtual reality content in a virtual reality mode on a display;

identifying whether a request to change an external input device is received;

in response to identifying that the request to change the external input device is received, switching from the virtual reality mode to a see-through mode and displaying see-through content including an external image obtained using a camera module on at least part of the display;

in response to receiving a first signal including biometric authentication information indicating that a user's grip is sensed through a sensor included in a first external input device, performing connection with the first external input device; and after the connection is complete, switching from the see-through mode to the virtual reality mode, wherein performing connection with the first external input device includes outputting a third signal for connection corresponding to a direction of the electronic device while displaying the see-through content on at least part of the display and performing connection with the first external input device if a response signal is received from the first external input device in response to the third signal.

8. The non-transitory recording medium of claim 7, wherein determining whether there is the external input device includes broadcasting a request signal for a scan response to at least one external input device and receiving a response signal from the at least one external input device in response to the request signal, and wherein displaying the see-through content on at least part of the display includes displaying the see-through content on at least part of the display upon receiving a response signal containing information indicating whether an input or the biometric authentication information is sensed from the first external input device.

9. The non-transitory recording medium of claim 7, wherein performing connection with the first external input device includes detecting a direction of the user's gaze while displaying the see-through content on at least part of the display, forming a beam region corresponding to the detected direction of gaze, and performing connection with the first external input device if a connection signal for the first external input device is sensed in the formed beam region.

10. The non-transitory recording medium of claim 7, wherein performing connection with the first external input device includes measuring and storing a user's biometric authentication information, transferring a connection request signal to the first external input device, if a connection response signal containing biometric authentication information is received from the first external input device, compare the stored biometric authentication information with the received biometric authentication information, and if the stored biometric authentication information matches the received biometric authentication information, performing connection with the first external input device.

11. The non-transitory recording medium of claim 7, further comprising:

upon receiving a fourth signal according to a non-sensing of the user's input or a non-sensing of biometric authentication information from the first external input device, deactivating the first external input device;

displaying the see-through content obtained using the camera module on at least part of the display; and performing connection with a second external input device upon receiving the fourth signal according to a sensing of the user's input or biometric authentication information from the second external input device.

\* \* \* \* \*